United States Patent
Sasaki et al.

(10) Patent No.: US 10,366,712 B1
(45) Date of Patent: Jul. 30, 2019

(54) MAGNETIC HEAD FOR PERPENDICULAR MAGNETIC RECORDING INCLUDING TWO SIDE SHIELDS CONFIGURED TO ENABLE A REDUCTION IN WIDTH OF AN END FACE OF THE MAIN POLE LOCATED IN A MEDIUM FACING SURFACE AND AN INCREASE IN CROSS-SECTIONAL AREA OF THE MAIN POLE IN THE VICINITY OF THE MEDIUM FACING SURFACE

(71) Applicants: Yoshitaka Sasaki, Los Gatos, CA (US); Hiroyuki Ito, Milpitas, CA (US); Kazuki Sato, Milpitas, CA (US); Hironori Araki, Milpitas, CA (US); Yukinori Ikegawa, Milpitas, CA (US); Yoji Nomura, Milpitas, CA (US)

(72) Inventors: Yoshitaka Sasaki, Los Gatos, CA (US); Hiroyuki Ito, Milpitas, CA (US); Kazuki Sato, Milpitas, CA (US); Hironori Araki, Milpitas, CA (US); Yukinori Ikegawa, Milpitas, CA (US); Yoji Nomura, Milpitas, CA (US)

(73) Assignee: HEADWAY TECHNOLOGIES, INC., Milpitas, CA (US)

(*) Notice: Subject to any disclaimer, the term of this patent is extended or adjusted under 35 U.S.C. 154(b) by 0 days.

(21) Appl. No.: 15/880,458

(22) Filed: Jan. 25, 2018

(51) Int. Cl.
*G11B 5/11* (2006.01)
*G11B 5/127* (2006.01)
*G11B 5/31* (2006.01)
*G11B 5/60* (2006.01)

(52) U.S. Cl.
CPC .............. *G11B 5/3116* (2013.01); *G11B 5/11* (2013.01); *G11B 5/112* (2013.01); *G11B 5/1278* (2013.01); *G11B 5/315* (2013.01); *G11B 5/3163* (2013.01); *G11B 5/6082* (2013.01); *Y10T 29/49046* (2015.01); *Y10T 29/49052* (2015.01)

(58) Field of Classification Search
None
See application file for complete search history.

(56) References Cited

U.S. PATENT DOCUMENTS

| | | |
|---|---|---|
| 9,251,812 B2 | 2/2016 | Sasaki et al. |
| 9,406,317 B1 * | 8/2016 | Tang et al. ............. G11B 5/315 |
| 9,406,318 B2 | 8/2016 | Sasaki et al. |

* cited by examiner

*Primary Examiner* — Craig A. Renner
(74) *Attorney, Agent, or Firm* — Oliff PLC

(57) ABSTRACT

A first side shield has a first sidewall and a second sidewall, and a second side shield has a third sidewall and a fourth sidewall. The first to fourth sidewalls have first to fourth edges, respectively, that are farthest from a top surface of a substrate. The distance between a rear end of the first edge and a rear end of the third edge in a track width direction is greater than the distance between a front end of the first edge and a front end of the third edge in the track width direction. The distance between the second edge and the fourth edge in the track width direction increases with increasing distance from the medium facing surface.

22 Claims, 24 Drawing Sheets

MAGNETIC HEAD FOR PERPENDICULAR MAGNETIC RECORDING INCLUDING TWO SIDE SHIELDS CONFIGURED TO ENABLE A REDUCTION IN WIDTH OF AN END FACE OF THE MAIN POLE LOCATED IN A MEDIUM FACING SURFACE AND AN INCREASE IN CROSS-SECTIONAL AREA OF THE MAIN POLE IN THE VICINITY OF THE MEDIUM FACING SURFACE

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has two side shields.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density when compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on the top surface of a substrate. The write head unit includes a main pole configured to produce a write magnetic field in the direction perpendicular to the plane of the recording medium. The main pole has an end face that is located in a medium facing surface configured to face the recording medium.

In a magnetic head for use in a magnetic disk drive of the perpendicular magnetic recording system, from the viewpoint of increasing the recording density, the end face of the main pole located in the medium facing surface is preferably smaller in width. On the other hand, from the viewpoint of improving the write characteristics of the write head unit, e.g., overwrite property which represents the overwriting capability, the main pole preferably has a larger cross-sectional area in the vicinity of the medium facing surface.

A magnetic disk drive of the perpendicular magnetic recording system may sometimes exhibit a phenomenon in which signals already written on one or more tracks in the neighborhood of a track targeted for writing are erased or attenuated during writing of a signal on the track targeted for writing. In the present application, such a phenomenon will be referred to as unwanted erasure. Unwanted erasure includes adjacent track erasure (ATE) and wide-area track erasure (WATE). Achieving higher recording densities requires minimizing the occurrence of unwanted erasure.

Known techniques for minimizing the occurrence of unwanted erasure include the technique of providing two side shields on opposite sides of the main pole in the track width direction, as disclosed in, for example, U.S. Pat. No. 9,251,812 B2 and U.S. Pat. No. 9,406,318 B2.

Each of U.S. Pat. Nos. 9,251,812 B2 and 9,406,318 B2 discloses a magnetic head including a first side shield and a second side shield. The first side shield has a first sidewall and a second sidewall, the first sidewall being closer to the medium facing surface than the second sidewall. The second side shield has a third sidewall and a fourth sidewall, the third sidewall being closer to the medium facing surface than the fourth sidewall. Each of the second and fourth sidewalls has an edge that is farthest from the top surface of the substrate and parallel to the medium facing surface. The main pole has a first to a fourth side surface. The first side surface is opposed to the first sidewall. Part of the second side surface is opposed to the second sidewall. The third side surface is opposed to the third sidewall. Part of the fourth side surface is opposed to the fourth sidewall.

The magnetic head disclosed in each of U.S. Pat. Nos. 9,251,812 B2 and 9,406,318 B2 achieves a large cross-sectional area of the main pole in the vicinity of the medium facing surface by reducing the distance between the medium facing surface and the edge of each of the second to fourth sidewalls. This results in improved write characteristics. On the other hand, the reduced distance between the medium facing surface and the edge of each of the second to fourth sidewalls in this magnetic head disadvantageously renders the first and second side shields more susceptible to saturation of magnetic flux, thus causing the first and second side shields to become unable to function satisfactorily, resulting in insufficient increase in recording density.

SUMMARY OF THE INVENTION

It is an object of the present invention to provide a magnetic head for perpendicular magnetic recording including a main pole and two side shields, the magnetic head being capable of providing both of improved write characteristics and increased recording density, and to provide a manufacturing method for the magnetic head.

A magnetic head for perpendicular magnetic recording of the present invention includes: a medium facing surface configured to face a recording medium; a coil; a main pole; a write shield formed of a magnetic material; a gap section; and a substrate having a top surface. The coil is configured to produce a magnetic field corresponding to data to be written on the recording medium. The main pole is configured to pass a magnetic flux corresponding to the magnetic field produced by the coil, and to produce a write magnetic field for writing data on the recording medium by means of a perpendicular magnetic recording system. The gap section is formed of a nonmagnetic material and provided between the main pole and the write shield. The coil, the main pole, the write shield and the gap section are disposed above the top surface of the substrate.

The write shield includes a first side shield and a second side shield located on opposite sides of the main pole in the track width direction. The first side shield has a first end face located in the medium facing surface, and has a first sidewall and a second sidewall facing the main pole. The second side shield has a second end face located in the medium facing surface, and has a third sidewall and a fourth sidewall facing the main pole. The first sidewall is connected to the first end face. The second sidewall is located farther from the medium facing surface than is the first sidewall. The third sidewall is connected to the second end face. The fourth sidewall is located farther from the medium facing surface than is the third sidewall.

The first sidewall has a first edge farthest from the top surface of the substrate. The second sidewall has a second edge farthest from the top surface of the substrate. The third sidewall has a third edge farthest from the top surface of the substrate. The fourth sidewall has a fourth edge farthest from the top surface of the substrate. Each of the first and third edges has a front end located in the medium facing surface and a rear end opposite to the front end. Each of the second and fourth edges has a front end closest to the medium facing surface.

The distance between the rear end of the first edge and the rear end of the third edge in the track width direction is greater than the distance between the front end of the first edge and the front end of the third edge in the track width direction. The distance between the second edge and the fourth edge in the track width direction increases with increasing distance from the medium facing surface.

The first edge and the second edge are contiguous to each other to form a first contour line, the rear end of the first edge and the front end of the second edge coinciding with each other. The third edge and the fourth edge are contiguous to each other to form a second contour line, the rear end of the third edge and the front end of the fourth edge coinciding with each other.

The front end of the second edge is an inflection point or a corner at which there occurs a change in an angle of inclination of the first contour line relative to a first direction at a first point on the first contour line when the first point is shifted from the first edge to the second edge, the first direction being perpendicular to the medium facing surface, the change being a decrease. The front end of the fourth edge is an inflection point or a corner at which there occurs a change in an angle of inclination of the second contour line relative to the first direction at a second point on the second contour line when the second point is shifted from the third edge to the fourth edge, the change being a decrease.

The main pole has an end face located in the medium facing surface, and has a first side surface and a second side surface. Part of the first side surface is opposed to the first sidewall. Part of the second side surface is opposed to the third sidewall.

The gap section includes a first portion interposed between the first side surface and the first and second sidewalls, and a second portion interposed between the second side surface and the third and fourth sidewalls.

The distance from the medium facing surface to the front end of the second edge, and the distance from the medium facing surface to the front end of the fourth edge are each within the range of 20 to 90 nm. The distance between the front end and the rear end of the first edge in the track width direction, and the distance between the front end and the rear end of the third edge in the track width direction are each within the range of 40 to 290 nm.

In the magnetic head for perpendicular magnetic recording of the present invention, in the medium facing surface, the distance between the first sidewall and the third sidewall in the track width direction may decrease toward the top surface of the substrate. In such a case, an angle that the second sidewall forms with a second direction perpendicular to the top surface of the substrate may be smaller than an angle that the first sidewall forms with the second direction in the medium facing surface. Further, an angle that the fourth sidewall forms with the second direction may be smaller than an angle that the third sidewall forms with the second direction in the medium facing surface.

The first sidewall may include a first front portion connected to the first end face, and a first rear portion connected to the second sidewall. The third sidewall may include a second front portion connected to the second end face, and a second rear portion connected to the fourth sidewall. An angle that the first rear portion forms with a direction perpendicular to the top surface of the substrate may be smaller than an angle that the first front portion forms with the direction perpendicular to the top surface of the substrate. An angle that the second rear portion forms with the direction perpendicular to the top surface of the substrate may be smaller than an angle that the second front portion forms with the direction perpendicular to the top surface of the substrate.

In the magnetic head for perpendicular magnetic recording of the present invention, the first side shield may include a first magnetic layer having the first sidewall, and a second magnetic layer having the second sidewall. The second side shield may include a third magnetic layer having the third sidewall, and a fourth magnetic layer having the fourth sidewall. In such a case, the first magnetic layer and the second magnetic layer may have equal saturation flux densities, and the third magnetic layer and the fourth magnetic layer may have equal saturation flux densities. Alternatively, the second magnetic layer may be higher in saturation flux density than the first magnetic layer, and the fourth magnetic layer may be higher in saturation flux density than the third magnetic layer. Alternatively, the second magnetic layer may be lower in saturation flux density than the first magnetic layer, and the fourth magnetic layer may be lower in saturation flux density than the third magnetic layer.

In the magnetic head for perpendicular magnetic recording of the present invention, the minimum distance between the second sidewall and the first side surface may be greater than the minimum distance between the first sidewall and the first side surface, and the minimum distance between the fourth sidewall and the second side surface may be greater than the minimum distance between the third sidewall and the second side surface.

In the magnetic head for perpendicular magnetic recording of the present invention, each of the first and third edges may include a portion projecting toward the main pole. Each of the second and fourth edges may include a portion projecting toward the main pole.

A manufacturing method for the magnetic head for perpendicular magnetic recording of the present invention includes the steps of: forming a first initial side shield and a second initial side shield, the first initial side shield becoming the first side shield later, the second initial side shield becoming the second side shield later; forming the first and second portions of the gap section after the first and second initial side shields are formed; forming an initial main pole after the first and second portions of the gap section are formed; forming the coil; and forming the medium facing surface so that the first initial side shield becomes the first side shield, the second initial side shield becomes the second side shield, and the initial main pole becomes the main pole.

In the manufacturing method of the present invention, the step of forming the first initial side shield and the second initial side shield may include the step of forming a magnetic layer having at least part of the first sidewall and at least part of the third sidewall, and the step of partially etching the magnetic layer so as to provide the magnetic layer with the second sidewall and the fourth sidewall.

The step of forming the first initial side shield and the second initial side shield may further include the step of forming a planarization layer to cover the magnetic layer, which is performed after the step of forming the magnetic layer and before the step of partially etching the magnetic layer, and the step of forming a mask on the planarization layer, which is performed after the step of forming the planarization layer and before the step of partially etching the magnetic layer. In such a case, in the step of partially etching the magnetic layer, the mask is used to partially etch the magnetic layer.

In the manufacturing method of the present invention, the first side shield may include a first magnetic layer having the first sidewall, and a second magnetic layer having the second sidewall. The second side shield may include a third magnetic layer having the third sidewall, and a fourth magnetic layer having the fourth sidewall. In such a case, the step of forming the first initial side shield and the second initial side shield may include the step of forming the first magnetic layer and the third magnetic layer, and the step of forming the second magnetic layer and the fourth magnetic layer after the first magnetic layer and the third magnetic layer are formed.

The step of forming the first magnetic layer and the third magnetic layer may include the step of forming a mask having two accommodation sections in which the first magnetic layer and the third magnetic layer are to be accommodated later, and the step of forming the first magnetic layer and the third magnetic layer in the two accommodation sections. In such a case, the first magnetic layer and the third magnetic layer may be formed by plating or sputtering.

The first sidewall may include a first front portion connected to the first end face, and a first rear portion connected to the second sidewall. The third sidewall may include a second front portion connected to the second end face, and a second rear portion connected to the fourth sidewall. In such a case, the step of forming the first magnetic layer and the third magnetic layer may include the step of forming an initial first magnetic layer including the first front portion and an initial third magnetic layer including the second front portion, and the step of partially etching the initial first magnetic layer to provide the initial first magnetic layer with the first rear portion so as to make the initial first magnetic layer into the first magnetic layer, and partially etching the initial third magnetic layer to provide the initial third magnetic layer with the second rear portion so as to make the initial third magnetic layer into the third magnetic layer.

An angle that the first rear portion forms with the direction perpendicular to the top surface of the substrate may be smaller than an angle that the first front portion forms with the direction perpendicular to the top surface of the substrate. An angle that the second rear portion forms with the direction perpendicular to the top surface of the substrate may be smaller than an angle that the second front portion forms with the direction perpendicular to the top surface of the substrate.

In the manufacturing method of the present invention, when the first side shield includes the first and second magnetic layers and the second side shield includes the third and fourth magnetic layers, the step of forming the second magnetic layer and the fourth magnetic layer may include the step of forming a mask having two accommodation sections in which the second magnetic layer and the fourth magnetic layer are to be accommodated later, and the step of forming the second magnetic layer and the fourth magnetic layer in the two accommodation sections. In such a case, the second magnetic layer and the fourth magnetic layer may be formed by plating or sputtering.

According to the magnetic head for perpendicular magnetic recording and its manufacturing method of the present invention, the first side shield has the first and second sidewalls, and the second side shield has the third and fourth sidewalls. This configuration enables a reduction in width of the end face of the main pole located in the medium facing surface and an increase in cross-sectional area of the main pole in the vicinity of the medium facing surface, and prevents saturation of magnetic flux in the first and second side shields. The present invention thus makes it possible to achieve both of improved write characteristics and increased recording density.

Other objects, features and advantages of the present invention will become fully apparent from the following description.

DETAILED DESCRIPTION OF THE PREFERRED EMBODIMENTS

First Embodiment

Figure 7:
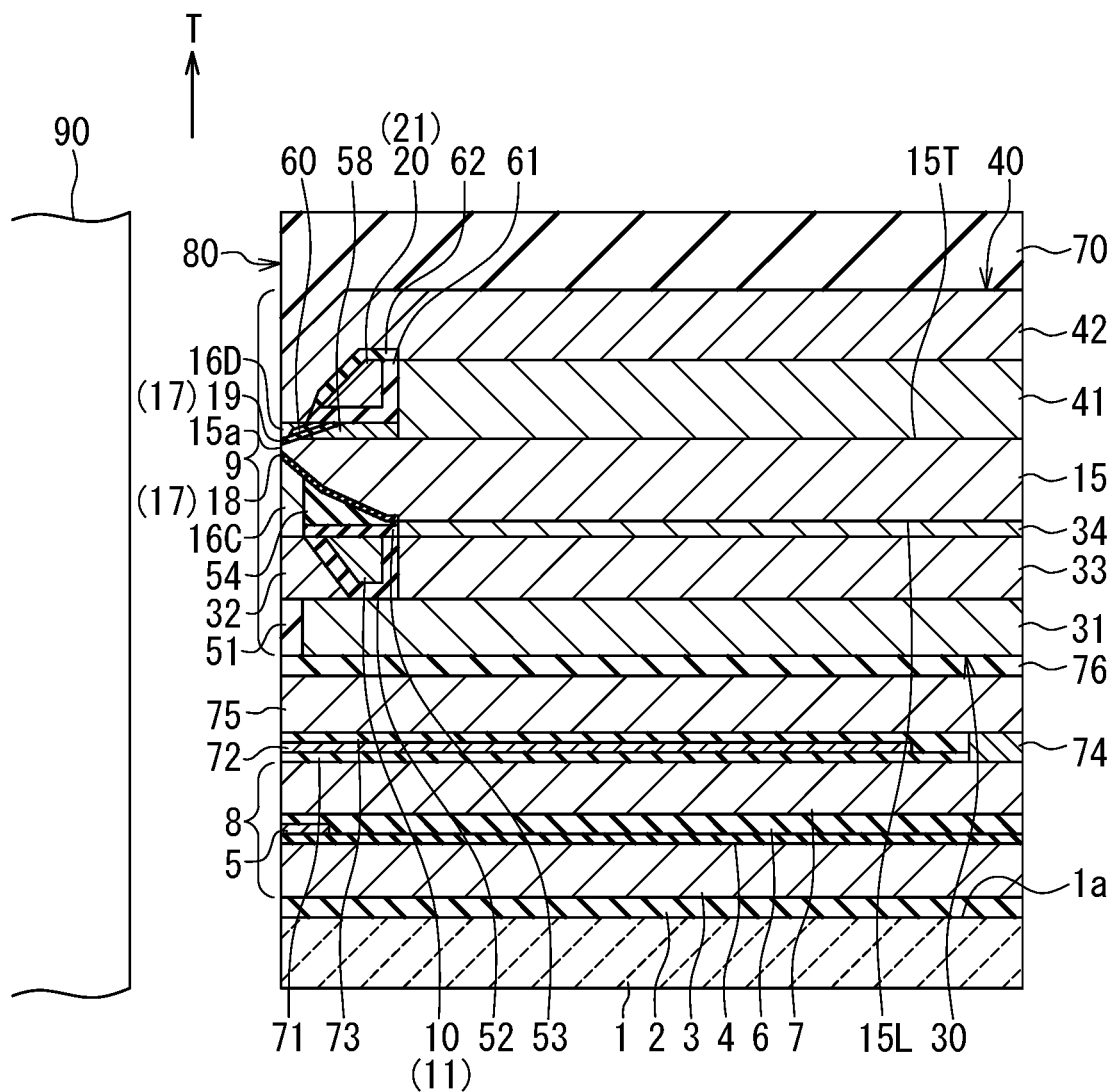
FIG. 7 is a cross-sectional view showing the configuration of the magnetic head according to the first embodiment of the invention.
Figure 8:
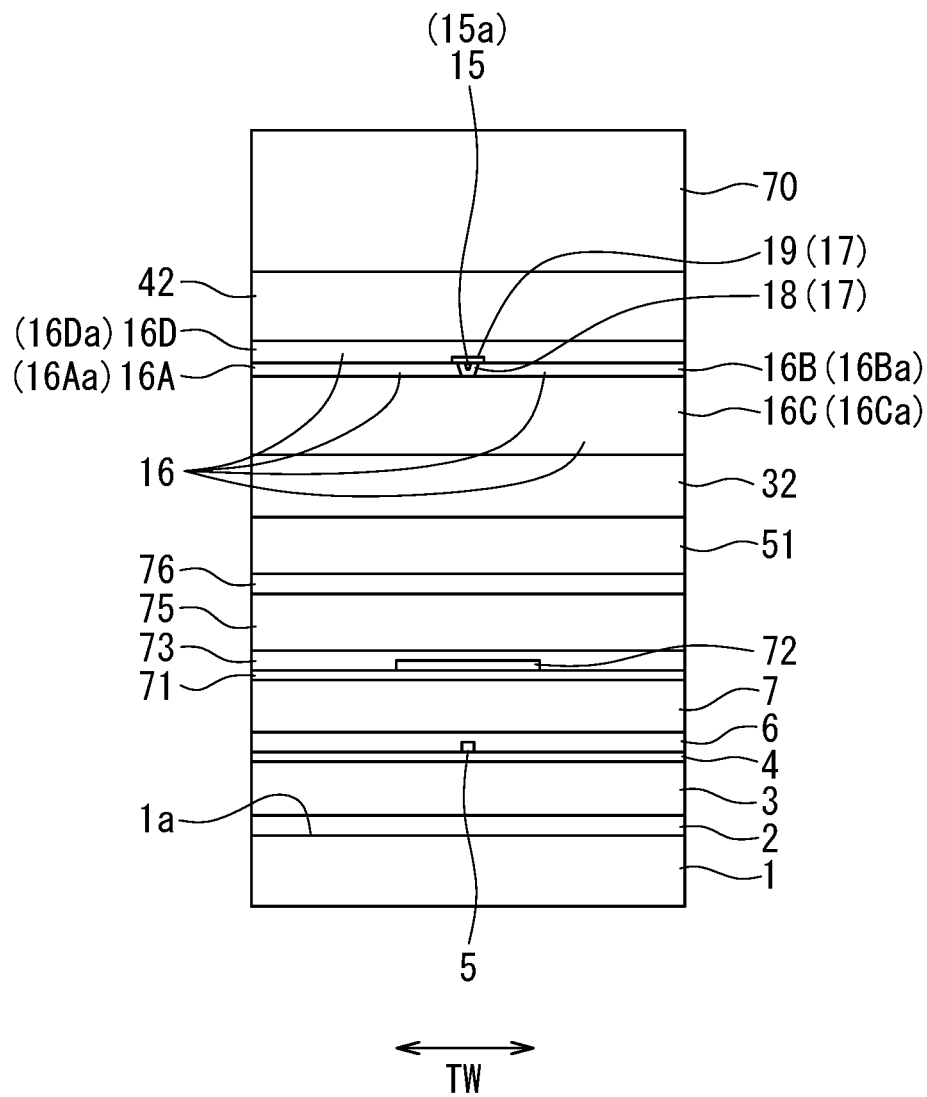
FIG. 8 is a front view showing the medium facing surface of the magnetic head according to the first embodiment of the invention.
Figure 9:
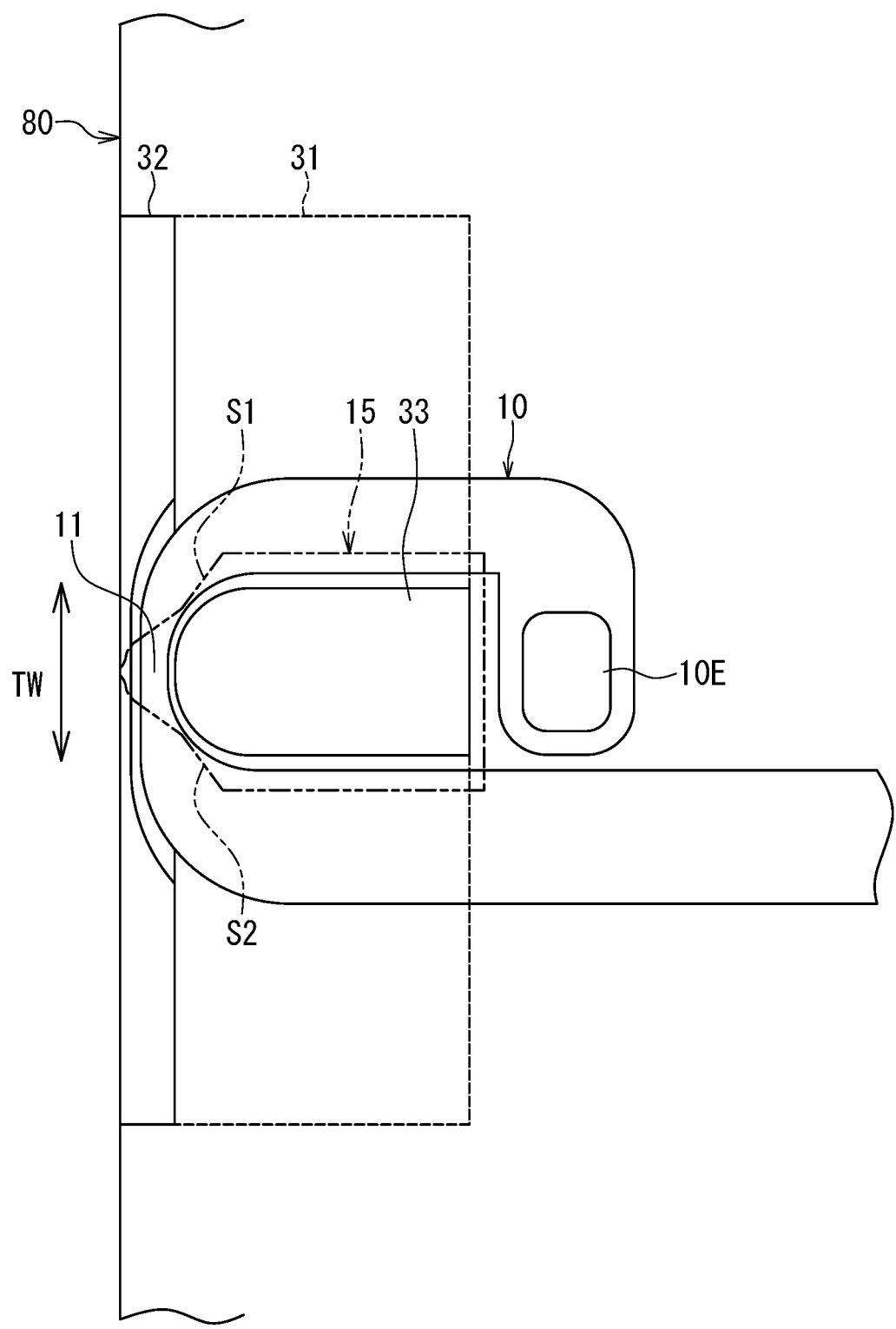
FIG. 9 is a plan view showing a first coil portion of the magnetic head according to the first embodiment of the invention.
Figure 10:
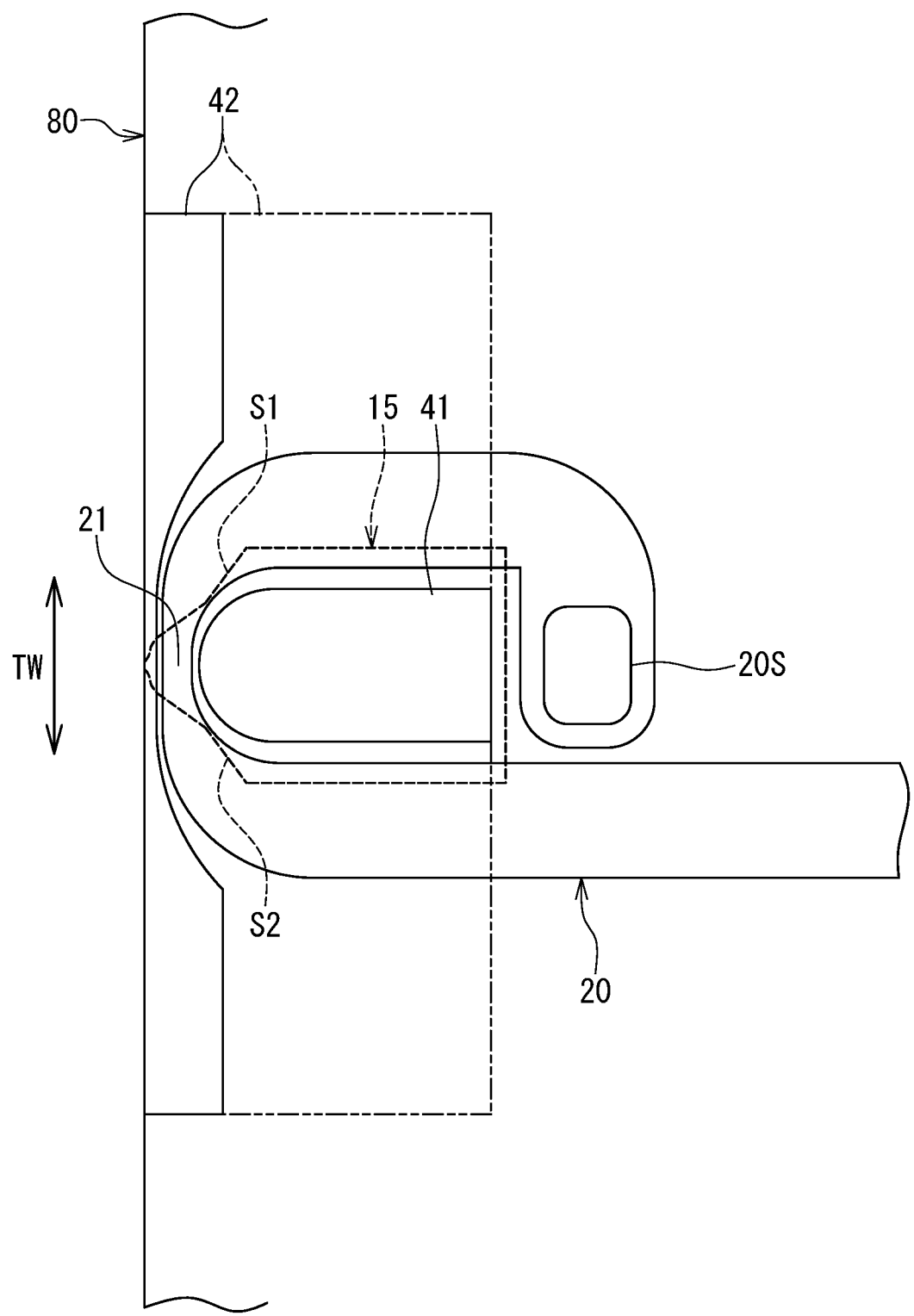
FIG. 10 is a plan view showing a second coil portion of the magnetic head according to the first embodiment of the invention.

Preferred embodiments of the present invention will now be described in detail with reference to the drawings. First, reference is made to FIG. 7 to FIG. 10 to describe the configuration of a magnetic head for perpendicular magnetic recording (hereinafter simply referred to as magnetic head) according to a first embodiment of the invention. FIG. 7 is a cross-sectional view of the magnetic head according to the present embodiment. The arrow T in FIG. 7 indicates the direction of travel of a recording medium. FIG. 8 is a front view showing the medium facing surface of the magnetic head according to the present embodiment. FIG. 9 is a plan view showing a first coil portion of the magnetic head according to the present embodiment. FIG. 10 is a plan view showing a second coil portion of the magnetic head according to the present embodiment. In FIG. 8 to FIG. 10, the arrow TW indicates the track width direction.

The magnetic head according to the present embodiment is for use in, for example, a magnetic disk drive, and is incorporated in a slider configured to fly over the surface of a rotating recording medium 90. The slider has a medium facing surface 80 configured to face the recording medium 90. The medium facing surface 80 has an air inflow end (a leading end) and an air outflow end (a trailing end). An airflow that comes from the leading end into the space between the medium facing surface 80 and the recording medium 90 causes the slider to slightly fly over the surface of the recording medium 90.

As shown in FIG. 7, the magnetic head has the medium facing surface 80. Further, as shown in FIG. 7 and FIG. 8, the magnetic head includes a substrate 1 having a top surface 1a. The substrate 1 is formed of a ceramic material such as aluminum oxide-titanium carbide ($Al_2O_3$—TiC).

For the positions of the components of the magnetic head, the term "above" as used herein refers to positions located in the direction that is perpendicular to the top surface 1a and away from the top surface 1a with respect to a reference position, and "below" refers to positions located in the direction that is perpendicular to the top surface 1a and toward the top surface 1a with respect to the reference position. For each of layers included in the magnetic head, the term "top surface" as used herein refers to the surface farthest from the top surface 1a, and "bottom surface" refers to the surface closest to the top surface 1a.

The magnetic head further includes: an insulating layer 2 formed of an insulating material such as alumina ($Al_2O_3$) and disposed on the top surface 1a of the substrate 1; a first read shield layer 3 formed of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head unit 8. The magnetic head further includes: a nonmagnetic layer 71 formed of a nonmagnetic material and lying on the second read shield layer 7; a contact sensor 72 lying on the nonmagnetic layer 71; and a nonmagnetic layer 73 formed of a nonmagnetic material and disposed to cover the nonmagnetic layer 71 and the contact sensor 72. The nonmagnetic layers 71 and 73 are formed of alumina, for example.

The magnetic head further includes: a middle shield 75 formed of a magnetic material and lying on the nonmagnetic layer 73; a magnetic layer 74 formed of a magnetic material and connecting the second read shield layer 7 and the middle shield 75; a nonmagnetic layer 76 formed of a nonmagnetic material and lying on the middle shield 75; and a write head unit 9 lying on the nonmagnetic layer 76. The magnetic layer 74 is located away from the medium facing surface 80 and embedded in the nonmagnetic layers 71 and 73. The middle shield 75 has the function of shielding the MR element 5 from magnetic fields generated in the write head unit 9. The nonmagnetic layer 76 is formed of alumina, for example.

The write head unit 9 includes a coil, a main pole 15, a write shield 16, and a gap section 17. The coil is configured to produce a magnetic field corresponding to data to be written on the recording medium 90. The coil includes a first coil portion 10 and a second coil portion 20. The first coil portion 10 and the second coil portion 20 are both formed of a conductive material such as copper. The first coil portion 10 and the second coil portion 20 are connected in series or in parallel. The main pole 15 has an end face 15*a* located in the medium facing surface 80. The main pole 15 is configured to pass a magnetic flux corresponding to the magnetic field produced by the coil, and to produce a write magnetic field for writing data on the recording medium 90 by means of a perpendicular magnetic recording system. FIG. 7 shows a cross section that intersects the end face 15*a* of the main pole 15 and that is perpendicular to the medium facing surface 80 and to the top surface 1*a* of the substrate 1. Such a cross section will hereinafter be referred to as the main cross section.

As shown in FIG. 8, the write shield 16 includes a first side shield 16A, a second side shield 16B, a bottom shield 16C, and a top shield 16D. The first and second side shields 16A and 16B are located on opposite sides of the main pole 15 in the track width direction TW. The bottom shield 16C is located closer to the top surface 1*a* of the substrate 1 than is the main pole 15. The top shield 16D is located farther from the top surface 1*a* of the substrate 1 than is the main pole 15. The first and second side shields 16A and 16B magnetically couple the bottom shield 16C and the top shield 16D to each other.

As shown in FIG. 8, the first side shield 16A has a first end face 16Aa located in the medium facing surface 80. The second side shield 16B has a second end face 16Ba located in the medium facing surface 80. The bottom shield 16C has an end face 16Ca located in the medium facing surface 80. The top shield 16D has an end face 16Da located in the medium facing surface 80.

The first and second end faces 16Aa and 16Ba are located on opposite sides of the end face 15*a* of the main pole 15 in the track width direction TW. The end face 16Ca is located on the rear side in the direction T of travel of the recording medium 90 relative to the end face 15*a* of the main pole 15. The end face 16Da is located on the front side in the direction T of travel of the recording medium 90 relative to the end face 15*a* of the main pole 15. In the medium facing surface 80, the end faces 16Aa, 16Ba, 16Ca and 16Da are arranged to surround the end face 15*a* of the main pole 15.

The write shield 16 is formed of a magnetic material. The material employed for the write shield 16 may be CoFeN, CoNiFe, NiFe, or CoFe, for example.

The write head unit 9 further includes a first return path section 30 and a second return path section 40. The first and second return path sections 30 and 40 are both formed of a magnetic material. For example, the first and second return path sections 30 and 40 may each be formed of one of CoFeN, CoNiFe, FeNi and CoFe. The first return path section 30 is located closer to the top surface 1*a* of the substrate 1 than is the main pole 15 and connects the write shield 16 to part of the main pole 15 located away from the medium facing surface 80, thereby magnetically coupling the write shield 16 to the main pole 15. The second return path section 40 is located farther from the top surface 1*a* of the substrate 1 than is the main pole 15, and connects the write shield 16 to part of the main pole 15 located away from the medium facing surface 80, thereby magnetically coupling the write shield 16 to the main pole 15.

The first return path section 30 includes a yoke 31 and coupling sections 32, 33 and 34. The yoke 31 lies on the nonmagnetic layer 76. The coupling sections 32 and 33 lie on the yoke 31. The coupling section 32 is located near the medium facing surface 80. The coupling section 33 is located farther from the medium facing surface 80 than is the coupling section 32. The yoke 31 has an end face that faces toward the medium facing surface 80 and located at a distance from the medium facing surface 80. The coupling section 32 has an end face located in the medium facing surface 80.

As shown in FIG. 9, the first coil portion 10 is wound around the coupling section 33. The write head unit 9 further includes: an insulating layer 51 formed of an insulating material and lying on the nonmagnetic layer 76 to surround the yoke 31; an insulating film 52 formed of an insulating material and separating the first coil portion 10 from the yoke 31 and the coupling sections 32 and 33; and an insulating layer (not illustrated) formed of an insulating material and disposed around the first coil portion 10 and the coupling section 32. The top surfaces of the first coil portion 10, the coupling sections 32 and 33, the insulating film 52 and the non-illustrated insulating layer are even with each other. The insulating layer 51, the insulating film 52 and the non-illustrated insulating layer are formed of alumina, for example.

The bottom shield 16C lies on the coupling section 32. The coupling section 34 lies on the coupling section 33. The write head unit 9 further includes an insulating layer 53 formed of an insulating material, and a nonmagnetic layer 54 formed of a nonmagnetic material. The insulating layer 53 lies on the first coil portion 10, the insulating film 52 and the non-illustrated insulating layer. The nonmagnetic layer 54 lies on the insulating layer 53 and surrounds the bottom shield 16C and the coupling section 34. The insulating layer 53 and the nonmagnetic layer 54 are formed of alumina, for example.

The first and second side shields 16A and 16B lie on the bottom shield 16C. The main pole 15 has the end face 15a, and further has: a bottom end 15L (see FIG. 7) facing toward the top surface 1a of the substrate 1; a top surface 15T (see FIG. 7) opposite to the bottom end 15L; and a first side surface S1 and a second side surface S2 (see FIG. 9 and FIG. 10) opposite to each other in the track width direction TW. Each of the first and second side shields 16A and 16B has a plurality of sidewalls. The sidewalls of the first side shield 16A and the sidewalls of the second side shield 16B will be described in detail later.

The gap section 17 is provided between the main pole 15 and the write shield 16. The write head unit 9 further includes a first gap layer 18 and a second gap layer 19. The first gap layer 18 is formed of a nonmagnetic material and includes a portion that forms a portion of the gap section 17. The second gap layer 19 is formed of a nonmagnetic material and includes a portion that forms another portion of the gap section 17. The aforementioned portion of the first gap layer 18 forming the portion of the gap section 17 is located between the main pole 15 and each of the first and second side shields 16A and 16B and the bottom shield 16C. The aforementioned portion of the second gap layer 19 forming the other portion of the gap section 17 is located between the main pole 15 and the top shield 16D.

The first gap layer 18 is disposed along the sidewalls of the first side shield 16A, the sidewalls of the second side shield 16B, the top surface of the bottom shield 16C, and the top surface of the nonmagnetic layer 54. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18.

A portion of the main pole 15 lies above the top surfaces of the bottom shield 16C and the nonmagnetic layer 54. The first gap layer 18 is interposed between the aforementioned portion of the main pole 15 and the top surfaces of the bottom shield 16C and the nonmagnetic layer 54. As shown in FIG. 8, the first gap layer 18 is interposed also between the main pole 15 and the first and second side shields 16A and 16B.

The bottom end 15L of the main pole 15 is in contact with the top surface of the coupling section 34 at a location away from the medium facing surface 80. The main pole 15 is formed of a ferromagnetic material containing one or more elements selected from the group consisting of Ni, Fe and Co, such as FeNi, CoNiFe, or CoFe. The shape of the main pole 15 will be described in detail later.

Figure 1:
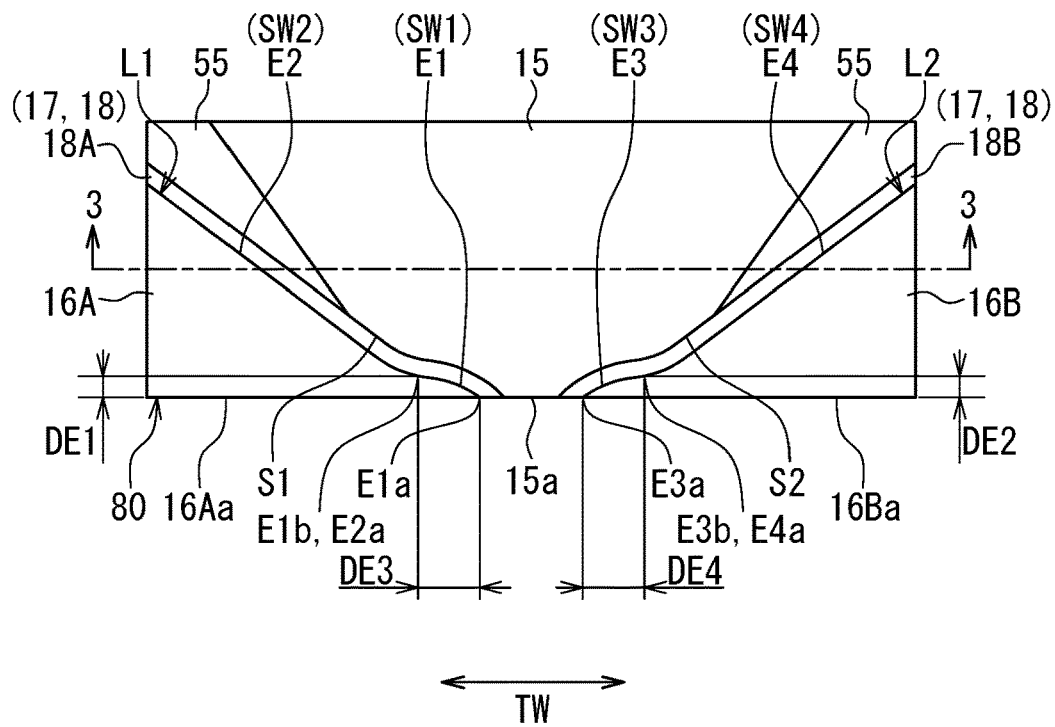
FIG. 1 is a plan view showing part of a main pole and first and second side shields in the vicinity of a medium facing surface in a magnetic head according to a first embodiment of the invention.

The write head unit 9 further includes a nonmagnetic layer 55 formed of a nonmagnetic material and disposed around the main pole 15 and the first and second side shields 16A and 16B. The nonmagnetic layer 55 is shown in FIG. 1, which will be described later. The nonmagnetic layer 55 is formed of alumina, for example.

The write head unit 9 further includes a nonmagnetic layer 58 formed of a nonmagnetic material and lying on a first portion of the top surface 15T of the main pole 15, the first portion being located at a distance from the medium facing surface 80. For example, the nonmagnetic layer 58 is formed of a nonmagnetic metal material such as Ru, NiCr or NiCu.

The second gap layer 19 is disposed to cover the main pole 15 and the nonmagnetic layer 58. The material of the second gap layer 19 may be a nonmagnetic insulating material such as alumina, or a nonmagnetic conductive material such as Ru, NiCu, Ta, W, NiB, or NiP.

The write head unit 9 further includes a nonmagnetic layer 60 formed of a nonmagnetic material and lying on the second gap layer 19. The nonmagnetic layer 60 has an end that is closest to the medium facing surface 80 and located at a distance from the medium facing surface 80. The nonmagnetic layer 60 is formed of alumina, for example.

The top shield 16D lies on the first and second side shields 16A and 16B, the second gap layer 19 and the nonmagnetic layer 60, and is in contact with the top surfaces of the first and second side shields 16A and 16B, the second gap layer 19 and the nonmagnetic layer 60. In the medium facing surface 80, part of the end face 16Da of the top shield 16D is spaced a predetermined distance apart from the end face 15a of the main pole 15, the predetermined distance being created by the thickness of the second gap layer 19. The thickness of the second gap layer 19 preferably falls within the range of 5 to 60 nm, and may be 30 to 60 nm, for example. The end face 15a of the main pole 15 has a side in contact with the second gap layer 19. This side of the end face 15a defines the track width.

The second return path section 40 includes coupling sections 41 and 42. The coupling section 41 lies on a second portion of the top surface 15T of the main pole 15, the second portion being located at a distance from the medium facing surface 80. The second portion of the top surface 15T of the main pole 15 is located farther from the medium facing surface 80 than is the first portion of the top surface 15T of the main pole 15.

As shown in FIG. 10, the second coil portion 20 is wound around the coupling section 41. The write head unit 9 further includes: a first insulating film 61 formed of an insulating material and separating at least part of the second coil portion 20 from the second gap layer 19, the coupling section 41 and the nonmagnetic layers 58 and 60; and a second insulating film 62 formed of an insulating material and disposed to cover at least part of the second coil portion 20 and the first insulating film 61. The first and second insulating films 61 and 62 are formed of alumina, for example.

The coupling section 42 lies on the top shield 16D, the coupling section 41 and the second insulating film 62. The coupling section 42 has an end face located in the medium facing surface 80.

The magnetic head further includes a protective layer 70 formed of a nonmagnetic material and disposed to cover the write head unit 9. The protective layer 70 is formed of, for example, an inorganic insulating material such as alumina.

As has been described, the magnetic head according to the present embodiment includes the medium facing surface 80, the read head unit 8, the write head unit 9, and the middle shield 75. The read head unit 8, the middle shield 75 and the write head unit 9 are arranged in this order above the top surface 1a of the substrate 1, the read head unit 8 being closest to the top surface 1a.

The write head unit 9 includes the coil including the first and second coil portions 10 and 20, the main pole 15, the write shield 16, the gap section 17, and the first and second return path sections 30 and 40. The coil, the main pole 15, the write shield 16, the gap section 17, and the first and second return path sections 30 and 40 are disposed above the top surface 1a of the substrate 1. The write shield 16 includes the first side shield 16A, the second side shield 16B, the bottom shield 16C and the top shield 16D. The gap section 17 is composed of part of the first gap layer 18 and part of the second gap layer 19. Since the first and second gap layers 18 and 19 are both formed of nonmagnetic material, the gap section 17 is formed of nonmagnetic material.

The first return path section 30 includes the yoke 31 and the coupling sections 32 to 34. The first return path section 30 is located closer to the top surface 1a of the substrate 1 than is the main pole 15, and connects the write shield 16 to part of the main pole 15 located away from the medium facing surface 80 so that a first space is defined by the main pole 15, the gap section 17 (the gap layer 18), the write shield 16 and the first return path section 30 (the yoke 31 and the coupling sections 32 to 34). The coupling section 32 magnetically couples the bottom shield 16C of the write shield 16 to the yoke 31. The coupling sections 33 and 34 magnetically couple the main pole 15 to the yoke 31. The first coil portion 10 passes through the first space.

The second return path section 40 includes the coupling sections 41 and 42. The second return path section 40 is located farther from the top surface 1a of the substrate 1 than is the main pole 15, and connects the write shield 16 to part of the main pole 15 located away from the medium facing surface 80 so that a second space is defined by the main pole 15, the gap section 17 (the gap layer 19), the write shield 16 and the second return path section 40 (the coupling sections 41 and 42). The coupling sections 41 and 42 magnetically couple the top shield 16D of the write shield 16 to the main pole 15. The second coil portion 20 passes through the second space.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 further has the function of capturing a magnetic flux that is produced from the end face 15a of the main pole 15 and spreads in directions other than the direction perpendicular to the plane of the recording medium 90, and thereby preventing the magnetic flux from reaching the recording medium 90. Furthermore, the write shield 16 and the first and second return path sections 30 and 40 have the function of allowing a magnetic flux that has been produced from the end face 15a of the main pole 15 and has magnetized a portion of the recording medium 90 to flow back.

The magnetic head according to the present embodiment further includes the contact sensor 72. The contact sensor 72 is provided for detecting contact of part of the medium facing surface 80 with the recording medium 90. For example, the contact sensor 72 is a resistor that varies in resistance with a change in its own temperature upon contact of part of the medium facing surface 80 with the recording medium 90. The resistor extends in the track width direction TW. The magnetic head according to the present embodiment includes a pair of leads (not illustrated) that are connected to opposite ends of the resistor.

Figure 2:
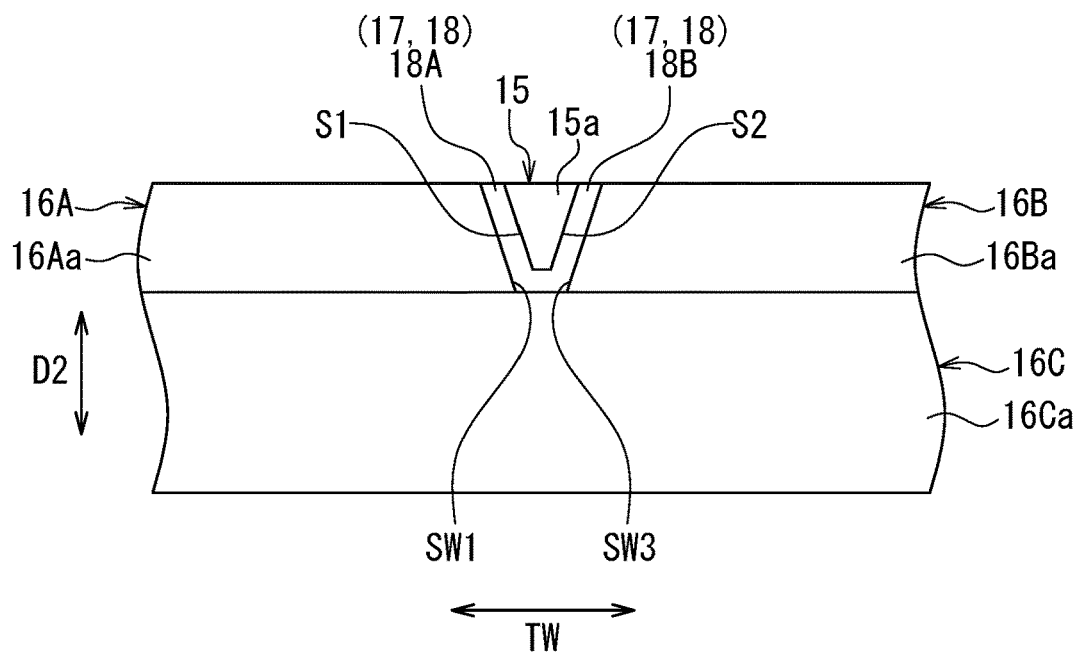
FIG. 2 is a front view showing respective end faces of the main pole and the first and second side shields located in the medium facing surface in the magnetic head according to the first embodiment of the invention.
Figure 3:
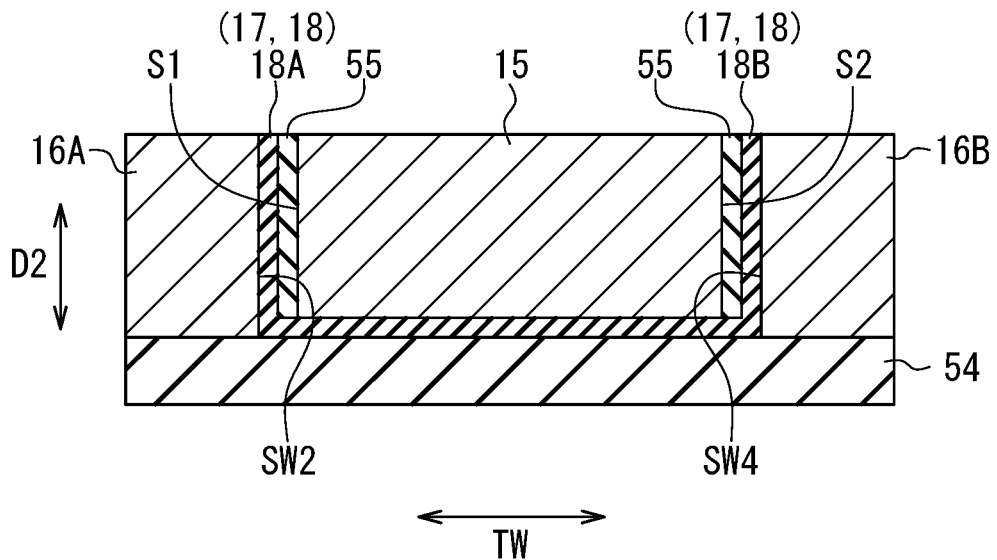
FIG. 3 is a cross-sectional view showing a cross section of each of the main pole and the first and second side shields parallel to the medium facing surface in the magnetic head according to the first embodiment of the invention.

The first and second side shields 16A and 16B will now be described in detail with reference to FIG. 1 to FIG. 3. FIG. 1 is a plan view showing part of the main pole 15 and the first and second side shields 16A and 16B in the vicinity of the medium facing surface 80. FIG. 2 is a front view showing respective end faces of the main pole 15 and the first and second side shields 16A and 16B located in the medium facing surface 80. FIG. 3 is a cross-sectional view showing a cross section of each of the main pole 15 and the first and second side shields 16A and 16B parallel to the medium facing surface 80. FIG. 3 shows a cross section taken along line 3-3 of FIG. 1.

As shown in FIG. 1 to FIG. 3, the first side shield 16A has: a first end face 16Aa located in the medium facing surface 80; and a first sidewall SW1 and a second sidewall SW2 facing toward the main pole 15. The first sidewall SW1 is connected to the first end face 16Aa. The second sidewall SW2 is located farther from the medium facing surface 80 than is the first sidewall SW1.

The second side shield 16B has: a second end face 16Ba located in the medium facing surface 80; and a third sidewall SW3 and a fourth sidewall SW4 facing toward the main pole 15. The third sidewall SW3 is connected to the second end face 16Ba. The fourth sidewall SW4 is located farther from the medium facing surface 80 than is the third sidewall SW3.

The first side shield 16A further has a fifth sidewall SW5. The fifth sidewall SW5 is located on a side of the second sidewall SW2 opposite from the first sidewall SW1, and connected to the second sidewall SW2. The second side shield 16B further has a sixth sidewall SW6. The sixth sidewall SW6 is located on a side of the fourth sidewall SW4 opposite from the third sidewall SW3, and connected to the fourth sidewall SW4. The fifth and sixth sidewalls SW5 and SW6 are shown in FIG. 14C and FIG. 17C, which will be described later.

As shown in FIG. 2, in the medium facing surface 80, the distance between the first sidewall SW1 and the third sidewall SW3 in the track width direction TW decreases toward the top surface 1a (see FIG. 7 and FIG. 8) of the substrate 1. A direction perpendicular to the top surface 1a of the substrate 1 is herein referred to as the second direction and denoted by symbol D2. An angle that the first sidewall SW1 forms with the second direction D2 is herein referred to as the first angle, and an angle that the third sidewall SW3 forms with the second direction D2 is herein referred to as the third angle. The first angle in the medium facing surface 80 and the third angle in the medium facing surface 80 fall within the range of, for example, 7° to 17°, and preferably within the range of 10° to 15°.

An angle that the second sidewall SW2 forms with the second direction D2 is herein referred to as the second angle, and an angle that the fourth sidewall SW4 forms with the second direction D2 is herein referred to as the fourth angle. As shown in FIG. 3, the second angle is smaller than the first angle in the medium facing surface 80, and the fourth angle is smaller than the third angle in the medium facing surface 80. The second angle and the fourth angle may be 0°.

The first angle at any position except in the medium facing surface 80 is greater than or equal to the second angle, and smaller than or equal to the first angle in the medium facing surface 80. The third angle at any position except in the medium facing surface 80 is greater than or equal to the fourth angle, and smaller than or equal to the third angle in the medium facing surface 80.

Although not illustrated, an angle that the fifth sidewall SW5 forms with the second direction D2 is smaller than the first angle in the medium facing surface 80 as is the second angle, and an angle that the sixth sidewall SW6 forms with the second direction D2 is smaller than the third angle in the medium facing surface 80 as is the fourth angle.

As shown in FIG. 1, the first sidewall SW1 has a first edge E1 farthest from the top surface 1a (see FIG. 7 and FIG. 8) of the substrate 1. The second sidewall SW2 has a second edge E2 farthest from the top surface 1a of the substrate 1. The first edge E1 has a front end E1a located in the medium facing surface 80 and a rear end E1b opposite to the front end E1a. The second edge E2 has a front end E2a closest to the medium facing surface 80. The first edge E1 and the second edge E2 are contiguous to each other to form a first contour line L1, the rear end E1b of the first edge E1 and the front end E2a of the second edge E2 coinciding with each other.

In the present embodiment, the first edge E1 includes a portion projecting toward the main pole 15. In the present embodiment, the projecting portion is particularly a curved portion passing through a portion closer to the main pole 15 relative to a straight line connecting the front end E1a and the rear end E1b.

As shown in FIG. 1, the third sidewall SW3 has a third edge E3 farthest from the top surface 1a (see FIG. 7 and FIG. 8) of the substrate 1. The fourth sidewall SW4 has a fourth edge E4 farthest from the top surface 1a of the substrate 1. The third edge E3 has a front end E3a located in the medium facing surface 80 and a rear end E3b opposite to the front end E3a. The fourth edge E4 has a front end E4a closest to the medium facing surface 80. The third edge E3 and the fourth edge E4 are contiguous to each other to form a second contour line L2, the rear end E3b of the third edge E3 and the front end E4a of the fourth edge E4 coinciding with each other.

In the present embodiment, the third edge E3 includes a portion projecting toward the main pole 15. In the present embodiment, the projecting portion is particularly a curved portion passing through a portion closer to the main pole 15 relative to a straight line connecting the front end E3a and the rear end E3b.

The distance between the rear end E1b of the first edge E1 and the rear end E3b of the third edge E3 in the track width direction TW is greater than the distance between the front end E1a of the first edge E1 and the front end E3a of the third edge E3 in the track width direction TW. The distance between the second edge E2 and the fourth edge E4 in the track width direction TW increases with increasing distance from the medium facing surface 80.

Figure 4:
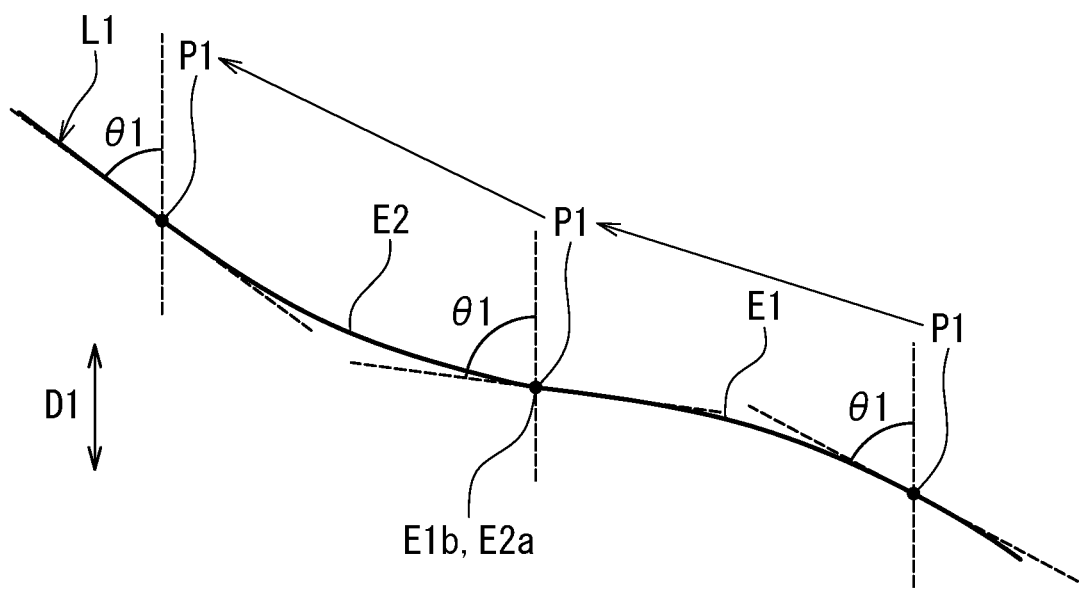
FIG. 4 is an explanatory diagram illustrating a portion of a first contour line in the magnetic head according to the first embodiment of the invention.

The positions of the front end E2a of the second edge E2 and the front end E4a of the fourth edge E4 will now be described in detail. FIG. 4 is an explanatory diagram illustrating a portion of the first contour line L1. As shown in FIG. 4, assume a first point P1 on the first contour line L1. A direction perpendicular to the medium facing surface 80 will be referred to as the first direction and denoted by the symbol D1. An angle of inclination θ1 of the first contour line L1 relative to the first direction D1 at the first point P1 varies with varying position of the first point P1. In the present embodiment, the front end E2a of the second edge E2 is an inflection point at which there occurs a change in the angle of inclination θ1 when the first point P1 is shifted from the first edge E1 to the second edge E2 as shown in FIG. 4, the change being a decrease.

Although not illustrated, assume a second point on the second contour line L2 similarly to the first point P1. An angle of inclination of the second contour line L2 relative to the first direction D1 at the second point varies with varying position of the second point. In the present embodiment, the front end E4a of the fourth edge E4 is an inflection point at which there occurs a change in the angle of inclination when the second point is shifted from the third edge E3 to the fourth edge E4, the change being a decrease.

As shown in FIG. 1, the distance from the medium facing surface 80 to the front end E2a of the second edge E2 is denoted by the symbol DE1, and the distance from the medium facing surface 80 to the front end E4a of the fourth edge E4 is denoted by the symbol DE2. The distances DE1 and DE2 are within the range of 20 to 90 nm. The distances DE1 and DE2 are preferably within the range of 30 to 70 nm.

Further, as shown in FIG. 1, the distance between the front end E1a and the rear end E1b of the first edge E1 in the track width direction TW is denoted by the symbol DE3, and the distance between the front end E3a and the rear end E3b of the third edge E3 in the track width direction TW is denoted by the symbol DE4. The distances DE3 and DE4 are within the range of 40 to 290 nm. The distances DE3 and DE4 are preferably within the range of 60 to 200 nm, more preferably within the range of 80 to 160 nm.

As will be described later in relation to a first modification example of a second embodiment, the front end E2a of the second edge E2 may be a corner at which there occurs a change in the angle of inclination θ1 when the first point P1 is shifted from the first edge E1 to the second edge E2, the change being a decrease. Likewise, the front end E4a of the fourth edge E4 may be a corner at which there occurs a change in the angle of inclination when the second point is shifted from the third edge E3 to the fourth edge E4, the change being a decrease.

The fifth sidewall SW5 has a fifth edge E5 farthest from the top surface 1a of the substrate 1. The sixth sidewall SW6 has a sixth edge E6 farthest from the top surface 1a of the substrate 1. The fifth and sixth edges E5 and E6 are shown in FIG. 17C, which will be described later. The fifth and sixth edges E5 and E6 are parallel to the medium facing surface 80.

Figure 5:
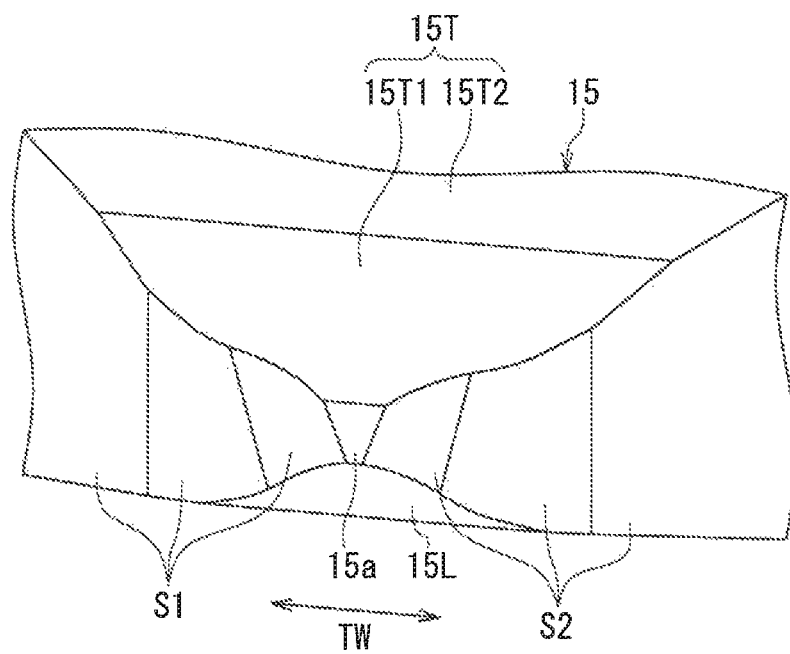
FIG. 5 is a perspective view showing a portion of the main pole in the vicinity of the medium facing surface in the magnetic head according to the first embodiment of the invention.
Figure 6:
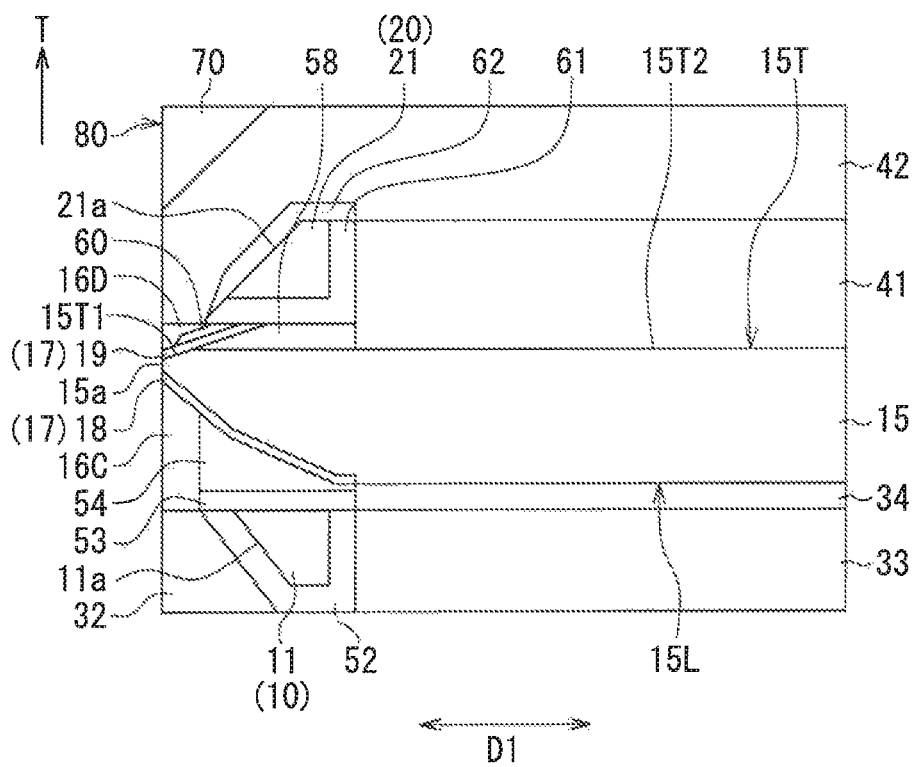
FIG. 6 is a cross-sectional view showing the main part of the magnetic head according to the first embodiment of the invention.

Now, the main pole 15 and the gap section 17 will be described in detail with reference to FIG. 1, FIG. 2, FIG. 5 and FIG. 6. FIG. 5 is a perspective view showing a portion of the main pole 15 in the vicinity of the medium facing surface 80. FIG. 6 is a cross-sectional view showing the main part of the magnetic head according to the present embodiment. FIG. 6 shows the main cross section.

As described previously, the main pole 15 has the end face 15a, the bottom end 15L, the top surface 15T, the first side surface S1, and the second side surface S2. As shown in FIG. 2 and FIG. 5, the end face 15a of the main pole 15 has a first side located at an end of the top surface 15T, and has a second side and a third side opposite to each other in the track width direction TW. The first side is in contact with the second gap layer 19. The distance between the second side and the third side in the track width direction TW decreases toward the top surface 1a (see FIG. 7 and FIG. 8) of the substrate 1. Each of the second side and the third side forms an angle in the range of, for example, 7° to 17°, or preferably in the range of 10° to 15°, with the second direction D2. The first side has a length in the range of 0.05 to 0.20 μm, for example.

As shown in FIG. 5 and FIG. 6, the top surface 15T includes an inclined portion 15T1 and a flat portion 15T2, the inclined portion 15T1 being closer to the medium facing surface 80 than the flat portion 15T2. The inclined portion 15T1 has a first end located in the medium facing surface 80 and a second end opposite thereto. The flat portion 15T2 is connected to the second end of the inclined portion 15T1. The inclined portion 15T1 is inclined such that its second end is located on the front side in the direction T of travel of the recording medium 90 relative to its first end. The flat portion 15T2 extends in a direction substantially perpendicular to the medium facing surface 80.

As shown in FIG. 6, the bottom 15L includes an inclined portion and a flat portion, the inclined portion being closer to the medium facing surface 80 than the flat portion. The inclined portion of the bottom end 15L has a first end located in the medium facing surface 80 and a second end opposite thereto. The inclined portion of the bottom end 15L may be an edge formed by two intersecting planes, or may be a plane connecting two planes to each other. The flat portion of the bottom end 15L is a plane connected to the second end of the inclined portion of the bottom end 15L. The inclined portion of the bottom end 15L is inclined such that its second end is located on the rear side in the direction T of travel of the recording medium 90 relative to its first end. The flat portion of the bottom end 15L extends in a direction substantially perpendicular to the medium facing surface 80.

As shown in FIG. 1 and FIG. 5, part of the first side surface S1 is opposed to the first sidewall SW1 and part of the second sidewall SW2. Part of the second side surface S2 is opposed to the third sidewall SW3 and part of the fourth sidewall SW4.

As shown in FIG. 2 and FIG. 5, in the medium facing surface 80 the distance between the first side surface S1 and the second side surface S2 in the track width direction TW decreases toward the top surface 1a of the substrate 1. A preferable range of the angle that each of the first and second side surfaces S1 and S2 forms with the second direction D2 in the medium facing surface 80 is the same as that for the first and third angles in the medium facing surface 80.

As shown in FIG. 3 and FIG. 5, the angle that the first side surface S1 forms with the second direction D2 at a position a predetermined distance or more apart from the medium facing surface 80 is smaller than the angle that the first side surface S1 forms with the second direction D2 in the medium facing surface 80, and the angle that the second side surface S2 forms with the second direction D2 at a position a predetermined distance or more apart from the medium facing surface 80 is smaller than the angle that the second side surface S2 forms with the second direction D2 in the medium facing surface 80. At a position a predetermined distance or more apart from the medium facing surface 80, each of the first side surface S1 and the second side surface S2 may form 0° with the second direction D2.

As shown in FIG. 1, the first gap layer 18 is disposed along the first to fourth sidewalls SW1 to SW4. The first gap layer 18 includes a first portion 18A interposed between the first side surface S1 and each of the first and second sidewalls SW1 and SW2, and a second portion 18B interposed between the second side surface S2 and each of the third and fourth sidewalls SW3 and SW4. Since the first gap layer 18 is a portion of the gap section 17, one can say that the gap section 17 includes the first and second portions 18A and 18B.

In the present embodiment, as shown in FIG. 1, the first portion 18A of the first gap layer 18 and the nonmagnetic layer 55 are interposed between the first side surface S1 and a portion of the second sidewall SW2, and the second portion 18B of the first gap layer 18 and the nonmagnetic layer 55 are interposed between the second side surface S2 and a portion of the fourth sidewall SW4. On the other hand, the first portion 18A of the first gap layer 18 is interposed between the first side surface S1 and each of the entire first sidewall SW1 and the remaining portion of the second sidewall SW2, but any portion of the nonmagnetic layer 55 is not interposed therebetween. The second portion 18B of the first gap layer 18 is interposed between the second side surface S2 and each of the entire third sidewall SW3 and the remaining portion of the fourth sidewall SW4, but any portion of the magnetic layer 55 is not interposed therebetween. The nonmagnetic layer 55 has the function of magnetically separating the main pole 15 from the side shields 16A and 16B at locations apart from the medium facing surface 80.

In the present embodiment, the minimum distance between the second sidewall SW2 and the first side surface S1 is equal to the minimum distance between the first sidewall SW1 and the first side surface S1, and the minimum distance between the fourth sidewall SW4 and the second side surface S2 is equal to the minimum distance between the third sidewall SW3 and the second side surface S2.

Reference is now made to FIG. 6, FIG. 9 and FIG. 10 to describe the first and second coil portions 10 and 20 and the first and second return path sections 30 and 40. As shown in FIG. 9, the first coil portion 10 is wound approximately once around the coupling section 33. The first coil portion 10 includes a first coil element 11 extending to pass through the first space, particularly through between the coupling section 32 and the coupling section 33. A coil element refers to a portion of the winding of a coil. The first coil portion 10 has a coil connection 10E electrically connected to the second coil portion 20.

As shown in FIG. 10, the second coil portion 20 is wound approximately once around the coupling section 41. The second coil portion 20 includes a second coil element 21 extending to pass through the second space, particularly through between the coupling section 41 and the coupling section 42.

The second coil portion 20 has a coil connection 20S electrically connected to the coil connection 10E of the first coil portion 10. The coil connection 20S is electrically connected to the coil connection 10E via first and second connection layers of columnar shape (not illustrated) that penetrate a plurality of layers interposed between the first coil portion 10 and the second coil portion 20. The first connection layer and the second connection layer are stacked in this order on the coil connection 10E. The coil connection 20S lies on the second connection layer. The first and second connection layers are each formed of a conductive material such as copper. In the example shown in FIG. 9 and FIG. 10, the first coil portion 10 and the second coil portion 20 are connected in series.

As shown in FIG. 6, the first coil element 11 has a first inclined surface 11a facing toward the medium facing surface 80. The first inclined surface 11a has a front end portion closest to the medium facing surface 80 and a rear end portion farthest from the medium facing surface 80. The first inclined surface 11a is inclined relative to the medium facing surface 80 and a direction perpendicular to the medium facing surface 80 such that the rear end portion is located closer to the top surface 1a (see FIG. 7 and FIG. 8) of the substrate 1, that is, located at a lower position, than is the front end portion. The coupling section 32 of the first return path section 30 has an inclined surface opposed to the first inclined surface 11a.

As shown in FIG. 6, the second coil element 21 has a second inclined surface 21a facing toward the medium facing surface 80. The second inclined surface 21a has a front end portion closest to the medium facing surface 80 and a rear end portion farthest from the medium facing surface 80. The second inclined surface 21a is inclined relative to the medium facing surface 80 and a direction perpendicular to the medium facing surface 80 such that the rear end portion is located farther from the top surface 1a (see FIG. 7 and FIG. 8) of the substrate 1, that is, located at an upper position, than is the front end portion. The coupling section 42 of the second return path section 40 has an inclined surface opposed to the second inclined surface 21a.

A manufacturing method for the magnetic head according to the present embodiment will now be described. As shown in FIG. 7 and FIG. 8, the manufacturing method for the magnetic head according to the present embodiment starts with forming the insulating layer 2, the first read shield layer 3 and the first read shield gap film 4 in this order into a stack on the substrate 1. Then, the MR element 5 and leads (not illustrated) connected to the MR element 5 are formed on the first read shield gap film 4. The MR element 5 and the leads are then covered with the second read shield gap film 6. Next, the second read shield layer 7 and the nonmagnetic layer 71 are formed in this order into a stack on the second read shield gap film 6.

Next, the contact sensor 72 and a pair of leads (not illustrated) connected to the contact sensor 72 are formed on the nonmagnetic layer 71. The contact sensor 72 and the pair of leads are then covered with the nonmagnetic layer 73. The nonmagnetic layers 71 and 73 are then selectively etched, so that an opening for exposing the top surface of the second read shield layer 7 is formed through the nonmagnetic layers 71 and 73. Then, the magnetic layer 74 is formed at the location of the opening. Then, the middle shield 75 and the nonmagnetic layer 76 are formed in this order into a stack over the nonmagnetic layer 73 and the magnetic layer 74.

Next, the yoke 31 is formed on the nonmagnetic layer 76 by frame plating, for example. Then, the insulating layer 51 is formed over the entire top surface of the stack. The insulating layer 51 is then polished by, for example, chemical mechanical polishing (hereinafter referred to as CMP), until the yoke 31 is exposed. Next, the coupling section 32 is formed on the yoke 31 and the insulating layer 51, and the coupling section 33 is formed on the yoke 31. For example, frame plating is employed to form the coupling section 33.

The coupling section 32 is formed in the following manner, for example. First, an initial coupling section which will later become the coupling section 32 is formed by frame plating, for example. Then, a photoresist mask is formed to cover a portion of the initial coupling section. The photoresist mask is formed by patterning a photoresist layer. Then, using the photoresist mask as an etching mask, a portion of the initial coupling section is taper-etched by, for example, ion beam etching (hereinafter referred to as IBE) so as to provide the initial coupling section with the aforementioned inclined surface of the coupling section 32. This makes the initial coupling section into the coupling section 32. The photoresist mask is then removed.

The manufacturing method for the magnetic head according to the present embodiment then proceeds to forming the insulating film 52 over the entire top surface of the stack by atomic layer deposition (ALD), for example. Next, a first initial coil portion, which will later become the first coil portion 10, is formed on the insulating film 52 by frame plating, for example. The first initial coil portion is formed such that a portion thereof rides over the coupling sections 32 and 33. The first initial coil portion, the coupling sections 32 and 33, the insulating film 52 and the non-illustrated insulating layer are then polished by CMP, for example. This makes the first initial coil portion into the first coil portion 10. Next, the insulating layer 53 is formed over the entire top surface of the stack. The insulating layer 53 is then selectively etched to form therein a first opening for exposing the top surface of the coupling section 32, a second opening for exposing the top surface of the coupling section 33, and a third opening for exposing the coil connection 10E (see FIG. 9) of the first coil portion 10.

Next, an initial bottom shield is formed on the coupling section 32 at the location of the first opening, the coupling section 34 is formed on the coupling section 33 at the location of the second opening, and the first connection layer (not illustrated) is formed on the coil connection 10E at the location of the third opening, by performing frame plating, for example. Next, the nonmagnetic layer 54 is formed over the entire top surface of the stack. The nonmagnetic layer 54 is then polished by, for example, CMP, until the initial bottom shield, the coupling section 34 and the first connection layer are exposed. Next, the initial bottom shield and the nonmagnetic layer 54 are taper-etched in part by, for example, IBE to thereby provide the top surface of the initial bottom shield with a portion to be opposed to the inclined portion (see FIG. 6) of the bottom end 15L of the main pole 15 to be formed later. This makes the initial bottom shield into the bottom shield 16C. This etching process also etches the coupling section 34 and the first connection layer in part.

A series of steps to be performed after the foregoing step will now be described with reference to FIG. 11 to FIG. 17C. FIG. 11 to FIG. 17C each show a stack of layers formed in the process of manufacturing the magnetic head. Each of FIG. 11, FIG. 13C, FIG. 14C, FIG. 15C and FIG. 17C shows the top surface of part of the stack. FIG. nA (n is an integer between 12 and 17 inclusive) shows a cross section of the stack taken at the location at which the medium facing surface 80 is to be formed. FIG. nB shows a cross section parallel to the main cross section and intersecting the second sidewall SW2 to be formed later. In each of FIG. 11, FIG. 13C, FIG. 14C and FIG. 15C, the symbol "ABS" indicates the location at which the medium facing surface 80 is to be formed.

Figure 11:
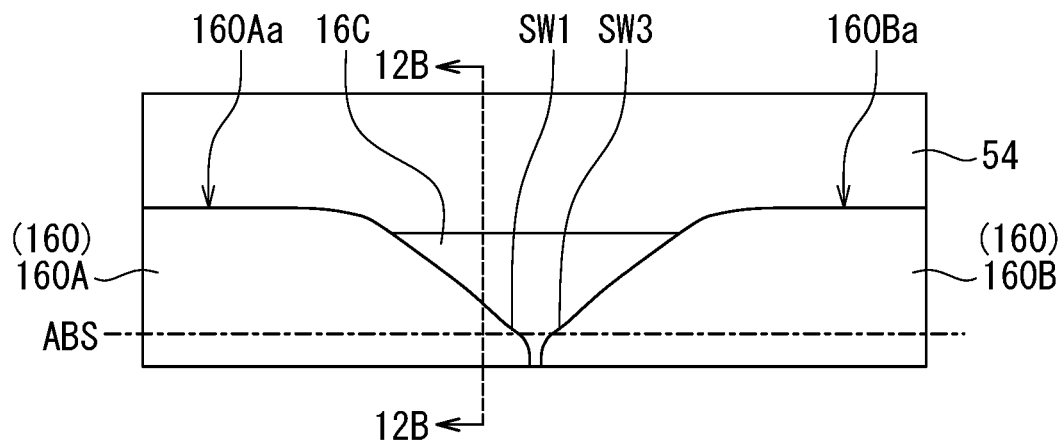
FIG. 11 is a plan view showing a step of a manufacturing method for the magnetic head according to the first embodiment of the invention.

FIG. 11 shows a step that follows the formation of the bottom shield 16C. In this step, a magnetic layer 160 is formed over the bottom shield 16C and the nonmagnetic layer 54 by frame plating, for example. The magnetic layer 160 is patterned to have the first sidewall SW1 of the first side shield 16A and the third sidewall SW3 of the second side shield 16B. The magnetic layer 160 includes a first portion 160A and a second portion 160B separate from each other. The first portion 160A has a sidewall 160Aa. The sidewall 160Aa includes the first sidewall SW1. The second portion 160B has a sidewall 160Ba. The sidewall 160Ba includes the third sidewall SW3.

Figure 12A:
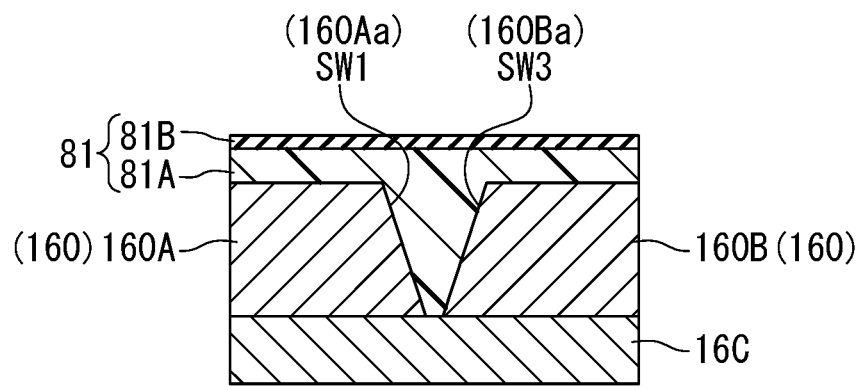
FIG. 12A and FIG. 12B are cross-sectional views showing a step that follows the step shown in FIG. 11.
Figure 12B:
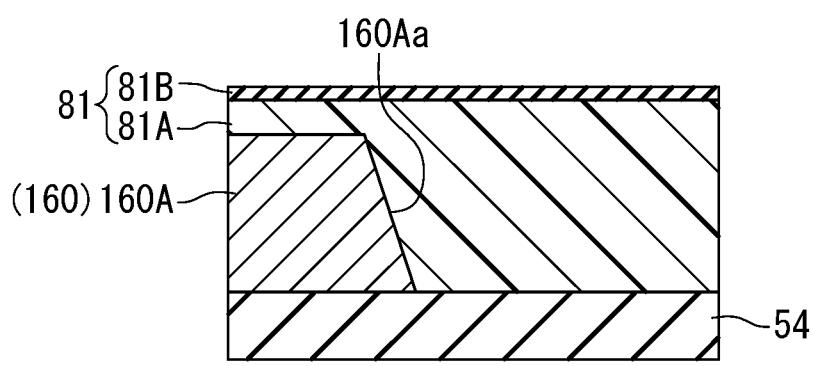

FIG. 12A and FIG. 12B show the next step. FIG. 12B shows part of a cross section taken along line 12B-12B of FIG. 11. In this step, a planarization layer 81 is formed to cover the stack including the magnetic layer 160. In the present embodiment, the planarization layer 81 includes a first layer 81A formed of a resin such as a photoresist and a second layer 81B formed of an inorganic material such as alumina and lying on the first layer 81A. The first layer 81A is formed such that its top surface is higher in level than the top surface of the magnetic layer 160. The second layer 81B is provided for preventing a mask to be formed on the planarization layer 81 from losing its shape.

Figure 13A:
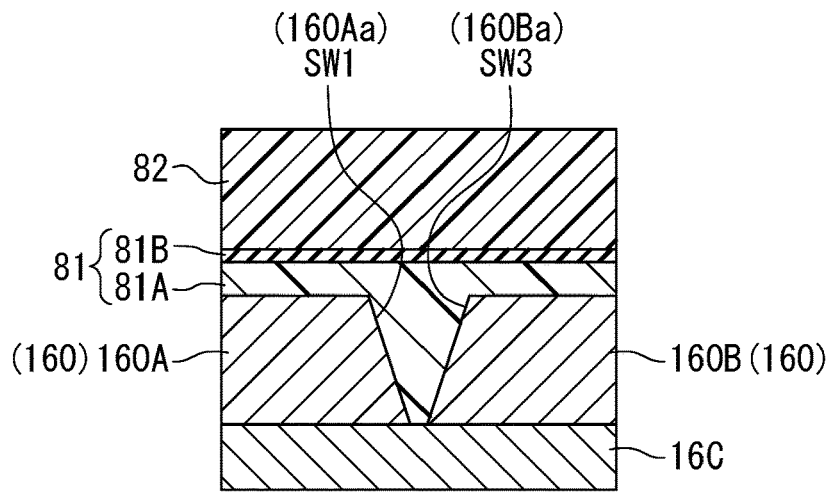
FIG. 13A to FIG. 13C are explanatory diagrams showing a step that follows the step shown in FIG. 12A and FIG. 12B.
Figure 13B:
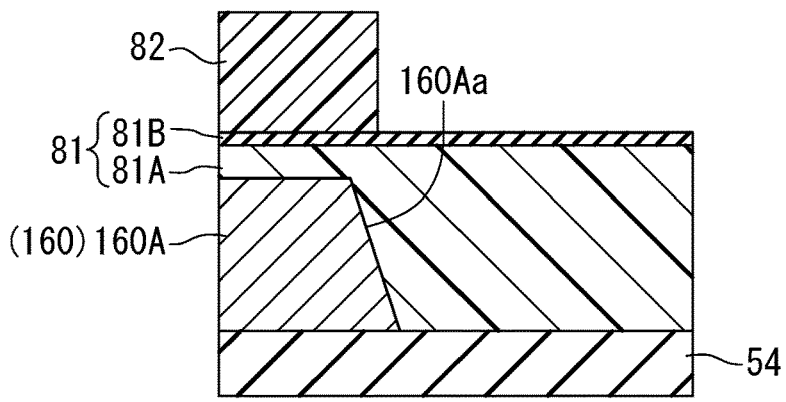
Figure 13C:
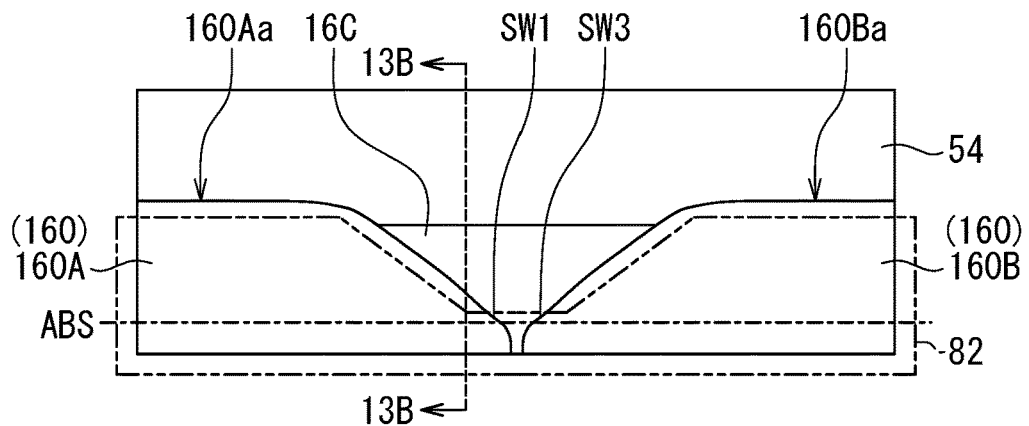

FIG. 13A to FIG. 13C show the next step. FIG. 13B shows part of a cross section taken along line 13B-13B of FIG. 13C. In this step, a mask 82 is formed on the planarization layer 81. FIG. 13C omits the illustration of the planarization layer 81. As shown in FIG. 13C, when viewed from above, the mask 82 covers the first sidewall SW1 and the third sidewall SW3, and does not cover the other portion of the sidewall 160Aa than the first sidewall SW1 or the other portion of the sidewall 160Ba than the third sidewall SW3. The mask 82 is formed by patterning a photoresist layer by photolithography, for example.

Figure 14A:
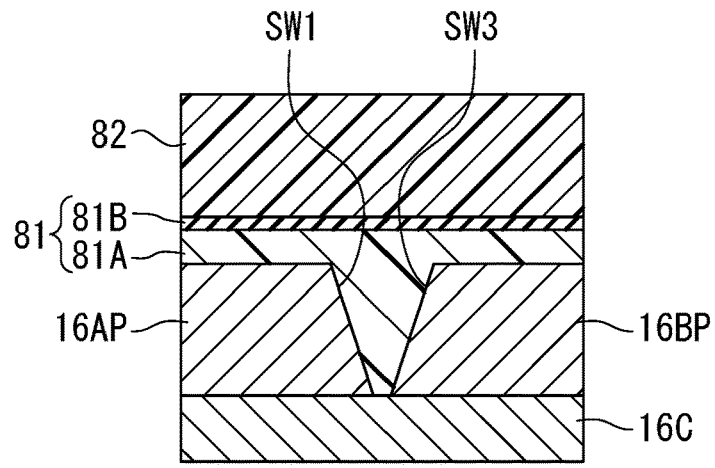
FIG. 14A to FIG. 14C are explanatory diagrams showing a step that follows the step shown in FIG. 13A to FIG. 13C.
Figure 14B:
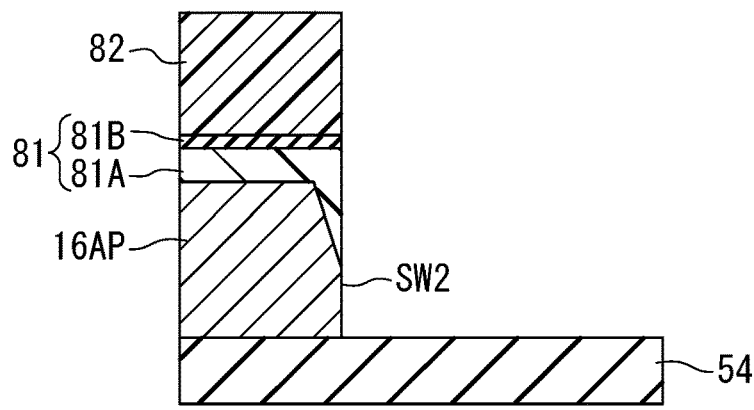
Figure 14C:
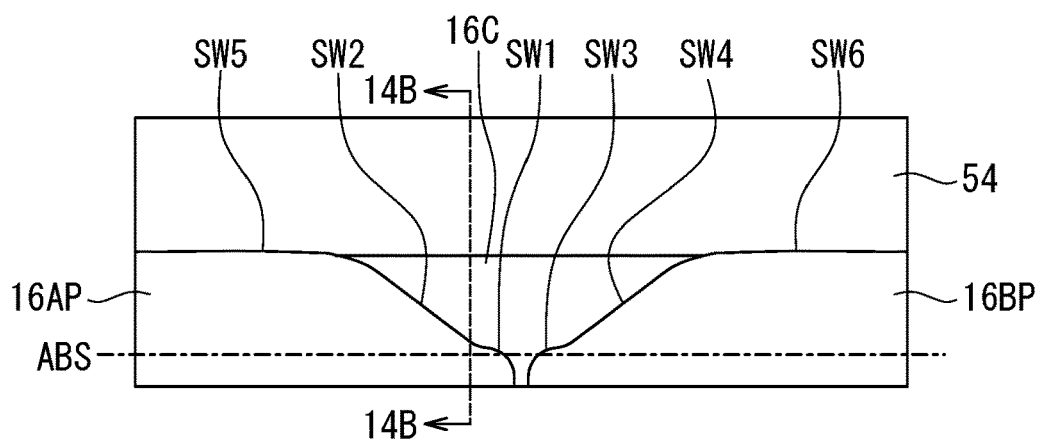

FIG. 14A to FIG. 14C show the next step. FIG. 14B shows part of a cross section taken along line 14B-14B of FIG. 14C. In this step, first, the planarization layer 81 and the magnetic layer 160 are etched by, for example, IBE, using the mask 82. This step will hereinafter be referred to as the etching step. In the etching step, the magnetic layer 160 is partially etched so as to provide the magnetic layer 160 with the second sidewall SW2 and the fourth sidewall SW4. The second sidewall SW2 and the fifth sidewall SW5 are formed at the first portion 160A of the magnetic layer 160. This makes the first portion 160A into a first initial side shield 16AP which will later become the first side shield 16A. The fourth sidewall SW4 and the sixth sidewall SW6 are formed at the second portion 160B of the magnetic layer 160. This makes the second portion 160B into a second initial side shield 16BP which will later become the second side shield 16B. Next, the planarization layer 81 remaining after the etching and the mask 82 are removed. FIG. 14C shows the stack having undergone the removal of the planarization layer 81 and the mask 82.

Figure 15A:
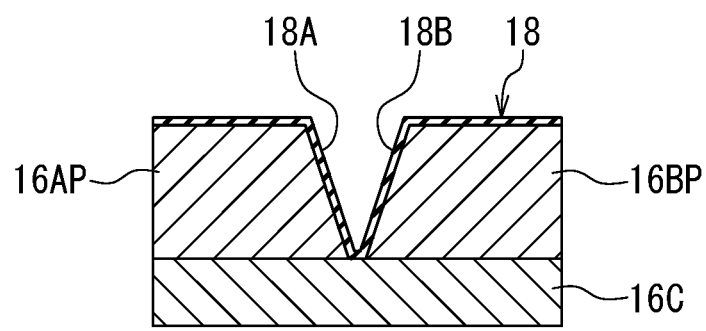
FIG. 15A to FIG. 15C are explanatory diagrams showing a step that follows the step shown in FIG. 14A to FIG. 14C.
Figure 15B:
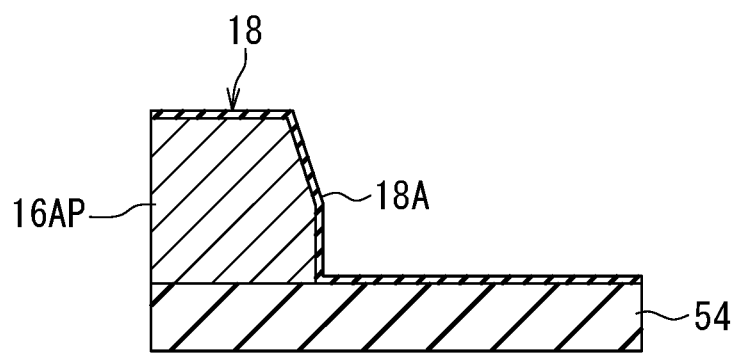
Figure 15C:
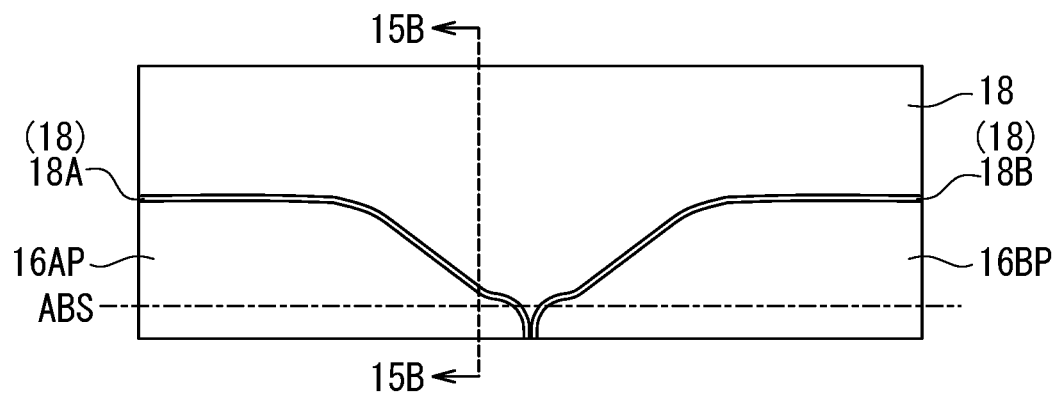

FIG. 15A to FIG. 15C show the next step. FIG. 15B shows part of a cross section taken along line 15B-15B of FIG. 15C. In this step, the first gap layer 18 is formed over the entire top surface of the stack. FIG. 15C omits the illustration of portions of the first gap layer 18 that are formed on the first and second initial side shields 16AP and 16BP. Where alumina is selected as the material of the first gap layer 18, the first gap layer 18 is formed by atomic layer deposition (ALD), for example. Where Ru is selected as the material of the first gap layer 18, the first gap layer 18 is formed by chemical vapor deposition (CVD), for example. As described previously, the first gap layer 18 includes the first and second portions 18A and 18B.

Figure 16A:
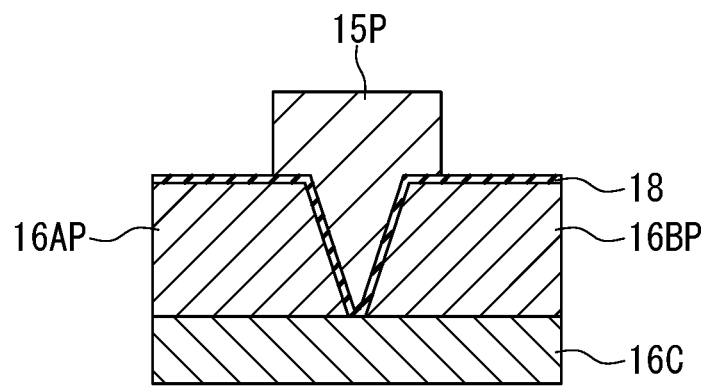
FIG. 16A and FIG. 16B are cross-sectional views showing a step that follows the step shown in FIG. 15A to FIG. 15C.
Figure 16B:
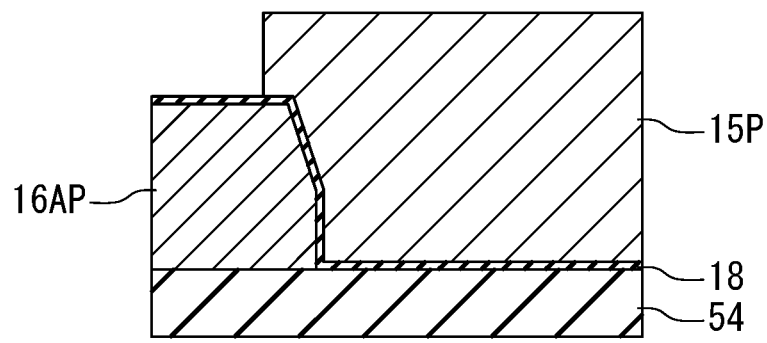

FIG. 16A and FIG. 16B show the next step. In this step, first, the first gap layer 18 is selectively etched to form therein an opening for exposing the top surface of the coupling section 34 (see FIG. 7) and an opening for exposing the top surface of the first connection layer. Next, an initial main pole 15P, which will later become the main pole 15, is formed on the first gap layer 18 and the coupling section 34, and the second connection layer (not illustrated) is formed on the first connection layer. The initial main pole 15P and the second connection layer are formed such that their top surfaces are higher in level than portions of the first gap layer 18 lying on the first and second initial side shields 16AP and 16BP.

Figure 17A:
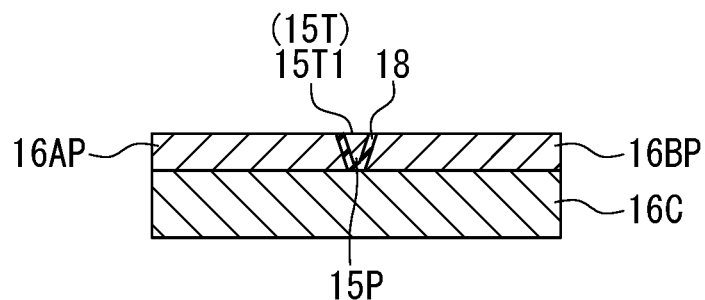
FIG. 17A to FIG. 17C are explanatory diagrams showing a step that follows the step shown in FIG. 16A and FIG. 16B.
Figure 17B:
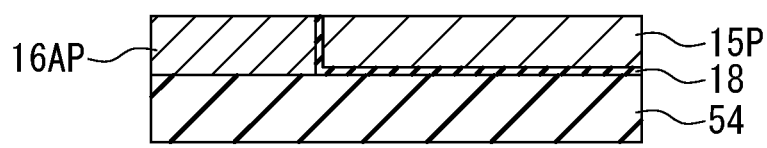
Figure 17C:
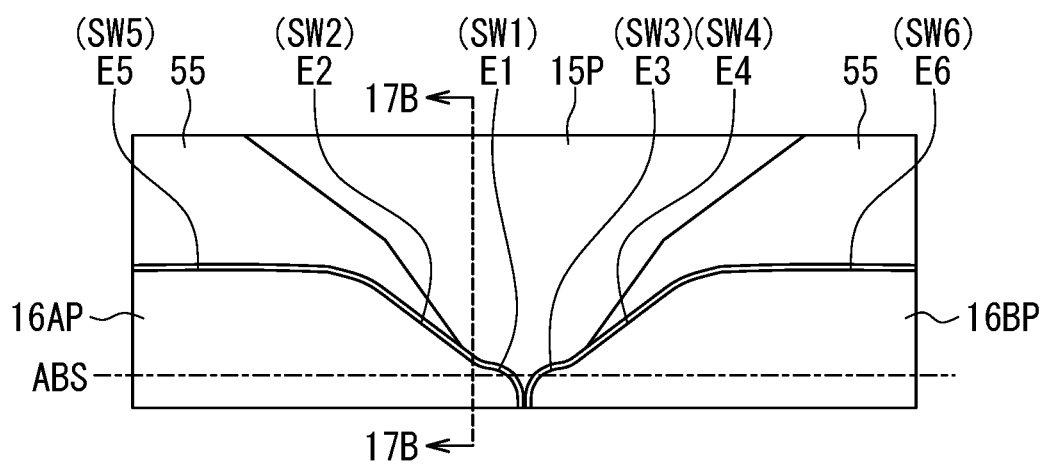

FIG. 17A to FIG. 17C show the next step. FIG. 17B shows part of a cross section taken along line 17B-17B of FIG. 17C. In this step, first, the nonmagnetic layer 55 is formed over the entire top surface of the stack. Next, the initial main pole 15P, the first and second initial side shields 16AP and 16BP, the first gap layer 18, the nonmagnetic layer 55 and the second connection layer are polished by, for example, CMP until the level of the top surface of the initial main pole 15P reaches the level of the flat portion 15T2 (see FIG. 6) of the top surface 15T of the main pole 15. Then, the nonmagnetic layer 58 (see FIG. 6 and FIG. 7) is formed on part of the top surface of the initial main pole 15P. The initial main pole 15P, the first and second initial side shields 16AP and 16BP, the first gap layer 18 and the nonmagnetic layers 55 and 58 are then etched in part by, for example, IBE so as to provide the initial main pole 15P with the inclined portion 15T1. A portion of the top surface of the etched initial main pole 15P, the portion being covered with the nonmagnetic layer 58, makes the flat portion 15T2. FIG. 17C omits the illustration of the nonmagnetic layer 58.

FIG. 17C shows the first to sixth edges E1 to E6. The levels of the first to sixth edges E1 to E6 in the second direction D2 (see FIG. 2) are defined by the polishing step and the etching step described with reference to FIG. 17A to FIG. 17C.

Steps to follow the formation of the inclined portion 15T1 will now be described with reference to FIG. 7 and FIG. 8. First, the second gap layer 19 is formed over the entire top surface of the stack by sputtering or chemical vapor deposition, for example. The nonmagnetic layer 60 is then formed on the second gap layer 19. The nonmagnetic layer 60 may be formed by a lift-off process, or by initially forming a nonmagnetic film on the second gap layer 19 and then etching a portion of the nonmagnetic film. Next, the second gap layer 19 is selectively etched by, for example, IBE so that the top surfaces of the first and second initial side shields 16AP and 16BP are exposed in part. Then, the top shield 16D is formed over the first and second initial side shields 16AP and 16BP, the second gap layer 19 and the nonmagnetic layer 60 by frame plating, for example. The top shield 16D, the second gap layer 19 and the nonmagnetic layer 60 are then polished by, for example, CMP, until the nonmagnetic layer 58 is exposed.

Next, the nonmagnetic layer 58 is selectively etched by, for example, IBE, so that the flat portion 15T2 formed on the initial main pole 15P is exposed in part. The coupling section 41 is then formed on the initial main pole 15P by frame plating, for example. Next, the first insulating film 61 is formed over the entire top surface of the stack. The first insulating film 61 is then selectively etched to form therein an opening for exposing the top surface of the second connection layer. Next, a second initial coil portion, which will later become the second coil portion 20, is formed by frame plating, for example. The second initial coil portion is formed such that a portion thereof rides over the coupling section 41. Next, the second initial coil portion, the coupling section 41 and the first insulating film 61 are polished by CMP, for example. The second initial coil portion is then taper-etched in part by, for example, IBE, so as to provide the second initial coil portion with the second inclined surface 21a (see FIG. 6). This makes the second initial coil portion into the second coil portion 20.

Next, the first and second insulating films 61 and 62 are selectively etched by, for example, reactive ion etching or IBE, so that the top surfaces of the top shield 16D and the coupling section 41 are exposed. The coupling section 42 is then formed over the top shield 16D, the coupling section 41 and the second insulating film 62 by frame plating, for example. Next, the protective layer 70 is formed to cover the entire top surface of the stack. Wiring, terminals and other components are then formed on the protective layer 70, and the substrate 1 is cut near the location ABS at which the medium facing surface 80 is to be formed. Next, the cut surface is polished to form the medium facing surface 80 so that the first initial side shield 16AP becomes the first side shield 16A, the second initial side shield 16BP becomes the second side shield 16B, and the initial main pole 15P becomes the main pole 15. Then, fabrication of flying rails and other processes are performed to complete the magnetic head.

As has been described, the manufacturing method for the magnetic head according to the present embodiment includes the steps of: forming the first initial side shield 16AP and the second initial side shield 16BP; forming the first and second portions 18A and 18B of the gap section 17 after the first initial side shield 16AP and the second initial side shield 16BP are formed; forming the initial main pole 15P and the first and second coil portions 10 and 20 of the coil after the first and second portions 18A and 18B of the gap section 17 are formed; and forming the medium facing surface 80. In the present embodiment, the step of forming the first initial side shield 16AP and the second initial side shield 16BP includes: the step of forming the magnetic layer 160 having the first sidewall SW1 and the third sidewall SW3; the step of forming the planarization layer 81 after the magnetic layer 160 is formed; the step of forming the mask 82 after the planarization layer 81 is formed; and the etching step of partially etching the magnetic layer 160 using the mask 82 after the mask 82 is formed, so as to provide the magnetic layer 160 with the second sidewall SW2 and the fourth sidewall SW4.

The specific functions and effects of the magnetic head according to the present embodiment will now be described. In the present embodiment, the write shield 16 includes the first side shield 16A, the second side shield 16B, the bottom shield 16C and the top shield 16D. The present embodiment makes it possible that, in regions on opposite sides of the end face 15a of the main pole 15 in the track width direction TW and regions on the front and rear sides in the direction T of travel of the recording medium 90 relative to the end face 15a of the main pole 15, a magnetic flux that is produced from the end face 15a of the main pole 15 and spreads in directions other than the direction perpendicular to the plane of the recording medium 90 can be captured and thereby prevented from reaching the recording medium 90. By virtue of this, the present embodiment enables minimizing the occurrence of unwanted erasure, thereby increasing the recording density.

In the present embodiment, in particular, the first and second side shields 16A and 16B serves to minimize the spread in the track width direction of the magnetic flux produced from the end face 15a of the main pole 15. This results in increased track density.

In the present embodiment, the first side shield 16A has the first sidewall SW1, and the second side shield 16B has the third sidewall SW3. Part of the first side surface S1 of the main pole 15 is opposed to the first sidewall SW1, and part of the second side surface S2 of the main pole 15 is opposed to the third sidewall SW3. The first sidewall SW1 has the first edge E1, and the third sidewall SW3 has the third edge E3. The distance between the rear end E1b of the first edge E1 and the rear end E3b of the third edge E3 in the track width direction TW is greater than the distance between the front end E1a of the first edge E1 and the front end E3a of the third edge E3 in the track width direction TW. By virtue of this, the present embodiment allows the main pole 15 to have a large cross-sectional area in the vicinity of the medium facing surface 80 while allowing the end face 15a of the main pole 15 located in the medium facing surface 80 to be small in width. As a result, the present embodiment achieves higher track density and improved write characteristics.

In the present embodiment, in the medium facing surface 80 the distance between the first sidewall SW1 and the third sidewall SW3 in the track width direction TW decreases toward the top surface 1a of the substrate 1. Thus, in the present embodiment the width of the end face 15a of the main pole 15 decreases toward the top surface 1a of the substrate 1. This configuration enables minimizing the occurrence of unwanted erasure induced by a skew, thereby increasing the track density.

In the present embodiment, the first side shield 16A further has the second sidewall SW2, and the second side shield 16B further has the fourth sidewall SW4. If the second and fourth sidewalls SW2 and SW4 were not provided, the fifth sidewall SW5 and the sixth sidewall SW6 would be connected to the first sidewall SW1 and the third sidewall SW3, respectively. In such a case, the first and second side shields 16A and 16B would become smaller in volume and thus become more susceptible to saturation of magnetic flux.

In the present embodiment, in contrast, the distance between the second edge E2 of the second sidewall SW2 and the fourth edge E4 of the fourth sidewall SW4 in the track width direction TW increases with increasing distance from the medium facing surface 80. This can prevent the occurrence of magnetic flux saturation in the first and second side shields 16A and 16B and thereby allow the the first and second side shields 16A and 16B to perform their function satisfactorily. As a result, the present embodiment provides higher track density.

By virtue of the foregoing, the present embodiment achieves both of improved write characteristics and increased recording density.

In the present embodiment, the second and fourth sidewalls SW2 and SW4 are formed through the etching step that has been described with reference to FIG. 14A to FIG. 14C. More specifically, the position of the front end E2a of the second edge E2 and the position of the front end E4a of the fourth edge E4 are defined by etching. The present embodiment thus makes it possible to accurately define the positions of the front end E2a of the second edge E2 and the front end E4a of the fourth edge E4, and to bring the front end E2a of the second edge E2 and the front end E4a of the fourth edge E4 close to the medium facing surface 80. According to the present embodiment, bringing the front end E2a of the second edge E2 and the front end E4a of the fourth edge E4 close to the medium facing surface 80 results in a larger cross-sectional area of the main pole 15 in the vicinity of the medium facing surface 80.

Second Embodiment

Figure 18:
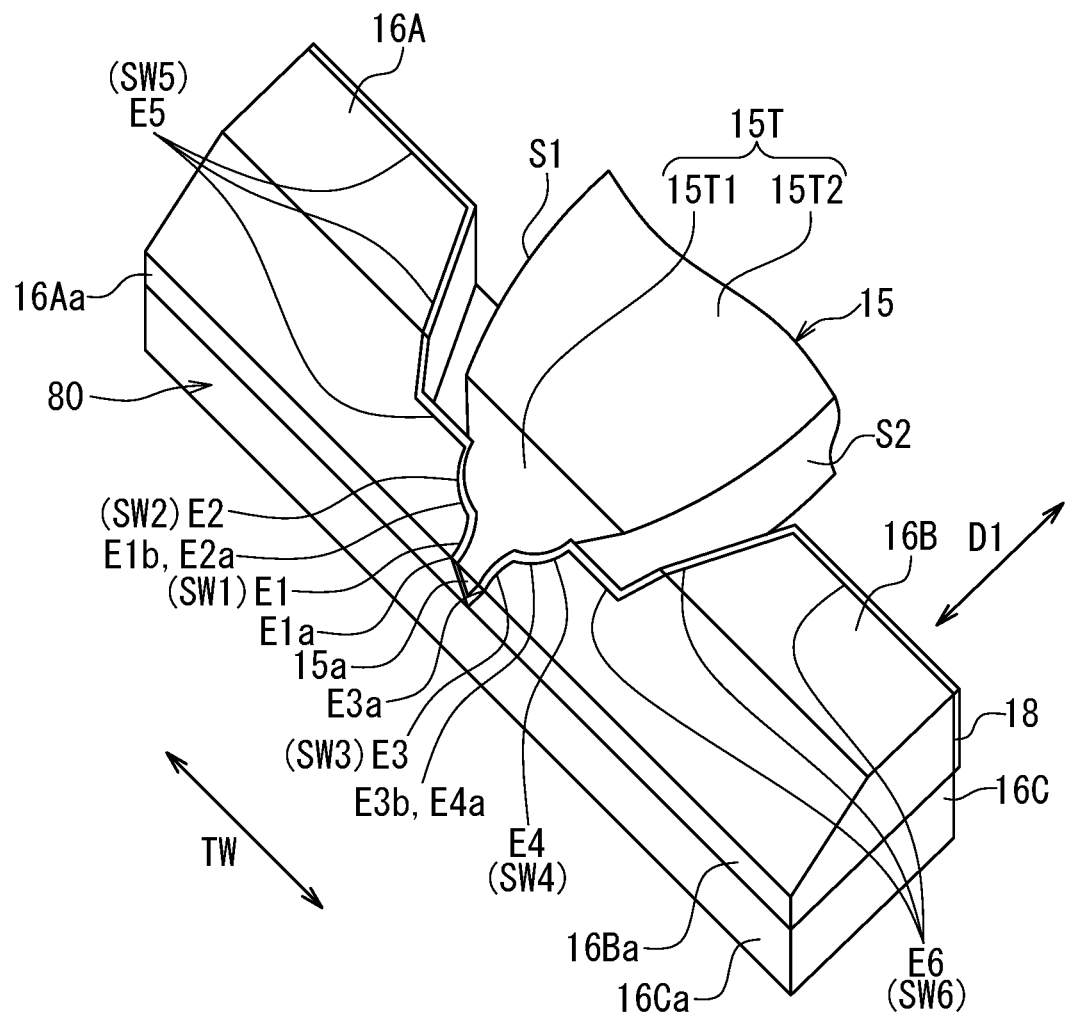
FIG. 18 is a perspective view showing part of a main pole and first and second side shields in the vicinity of a medium facing surface in a magnetic head according to a second embodiment of the invention.

A magnetic head according to a second embodiment of the present invention will now be described with reference to FIG. 18. FIG. 18 is a perspective view showing part of a main pole and first and second side shields in the vicinity of a medium facing surface in the magnetic head according to the present embodiment.

In the present embodiment, the shapes of the main pole 15 and the first and second side shields 16A and 16B are different from those in the first embodiment. In the present embodiment, the projecting portion of the first edge E1 of the first sidewall SW1 of the first side shield 16A projecting toward the main pole 15 is a corner and its surroundings located closer to the main pole 15 relative to a straight line connecting the front end E1a and the rear end E1b. The second edge E2 of the second sidewall SW2 of the first side shield 16A is shaped into a curve concaved away from the main pole 15. The fifth edge E5 of the fifth sidewall SW5 of the first side shield 16A includes a first edge portion, a second edge portion and a third edge portion arranged in this order, the first edge portion being closest to the second edge E2 of the second sidewall SW2. The first and third edge portions are parallel to the medium facing surface 80. The second edge portion is inclined relative to the first direction D1 which is perpendicular to the medium facing surface 80. Part of the first side surface S1 of the main pole 15 has a shape corresponding to the first and second sidewalls SW1 and SW2 of the present embodiment.

In the present embodiment, the projecting portion of the third edge E3 of the third sidewall SW3 of the second side shield 16B projecting toward the main pole 15 is a corner and its surroundings located closer to the main pole 15 relative to a straight line connecting the front end E3a and the rear end E3b. The fourth edge E4 of the fourth sidewall SW4 of the second side shield 16B is shaped into a curve concaved away from the main pole 15. The sixth edge E6 of the sixth sidewall SW6 of the second side shield 16B includes a fourth edge portion, a fifth edge portion and a sixth edge portion arranged in this order, the fourth edge portion being closest to the fourth edge E4 of the fourth sidewall SW4. The fourth and sixth edge portions are parallel to the medium facing surface 80. The fifth edge portion is inclined relative to the first direction D1. Part of the second side surface S2 of the main pole 15 has a shape corresponding to the third and fourth sidewalls SW3 and SW4 of the present embodiment.

Figure 19:
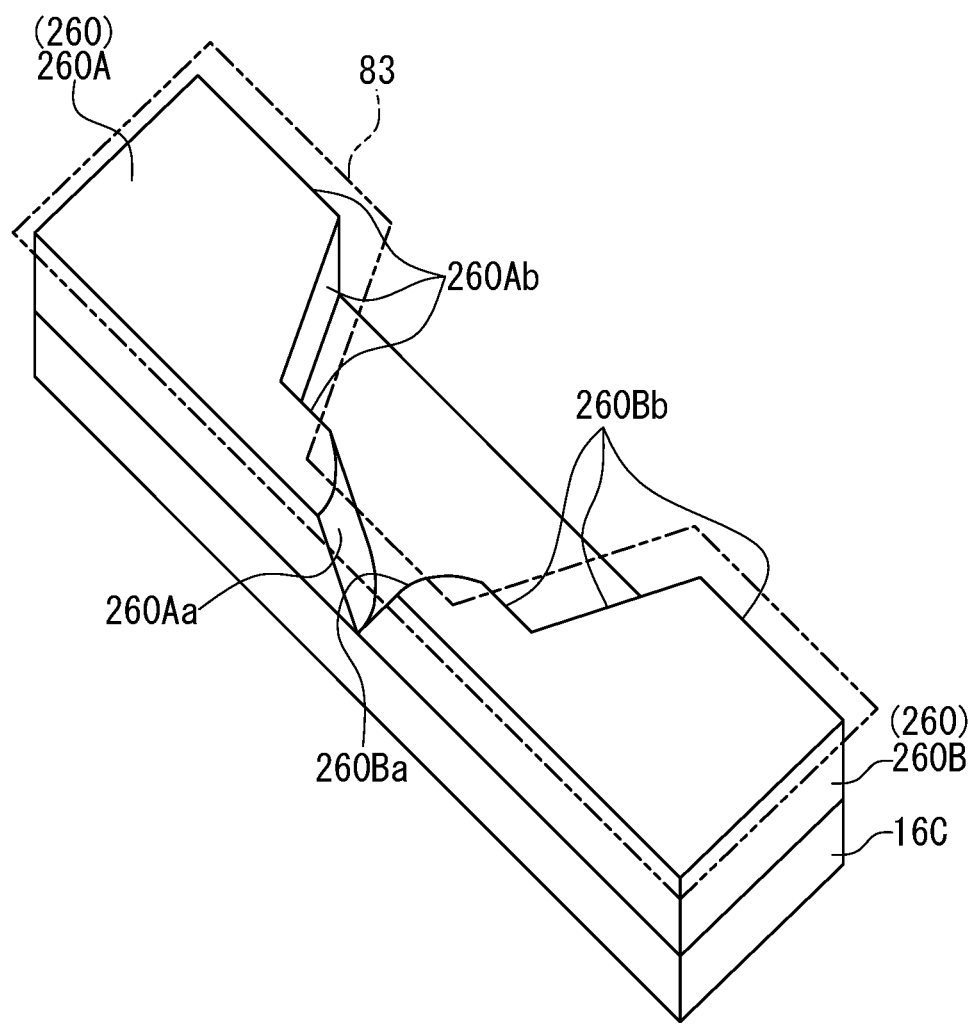
FIG. 19 is a perspective view showing a step of a manufacturing method for the magnetic head according to the second embodiment of the invention.
Figure 20:
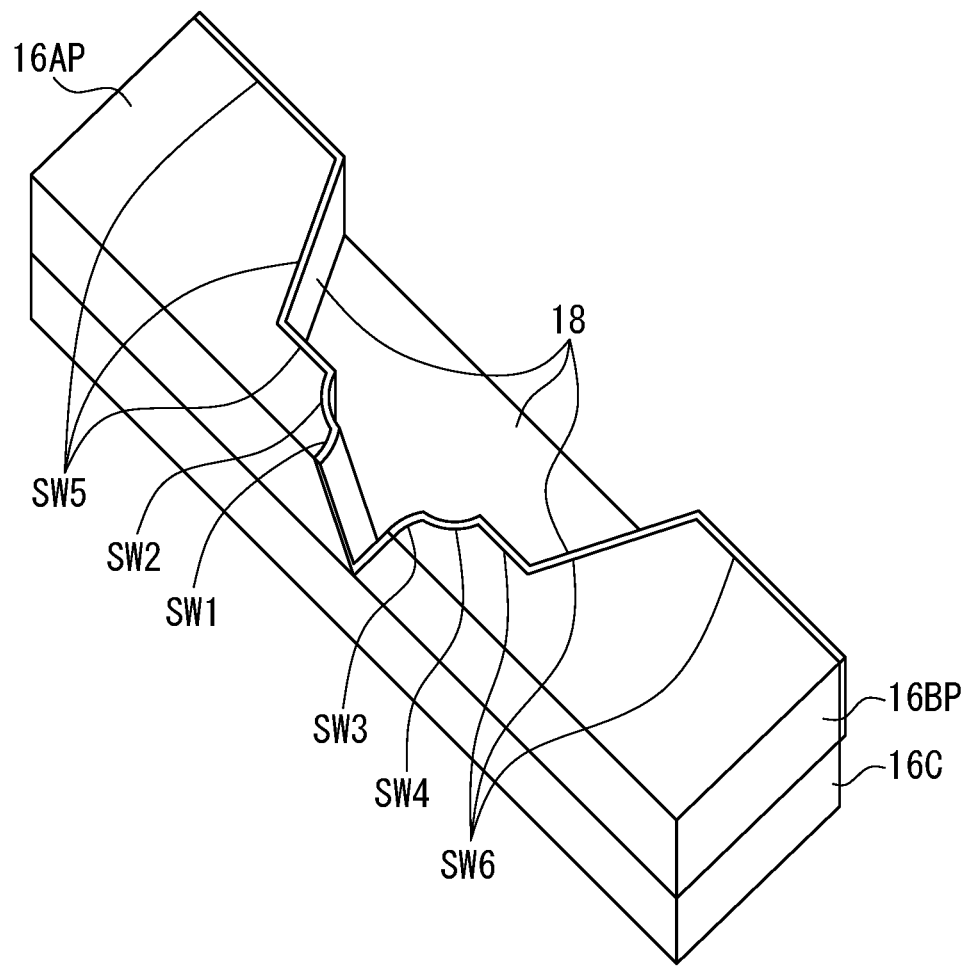
FIG. 20 is a perspective view showing a step that follows the step shown in FIG. 19.

Reference is now made to FIG. 19 and FIG. 20 to describe a manufacturing method for the magnetic head according to the present embodiment. FIG. 19 and FIG. 20 each show a stack of layers formed in the process of manufacturing the magnetic head. Each of FIG. 19 and FIG. 20 shows part of the stack.

The manufacturing method for the magnetic head according to the present embodiment is the same as the method according to the first embodiment up to the step of forming the bottom shield 16C. FIG. 19 shows the next step. In this step, first, a magnetic layer 260 is formed over the bottom shield 16C and the nonmagnetic layer 54 by frame plating, for example. The magnetic layer 260 is patterned to include a portion of the first sidewall SW1 of the first side shield 16A and a portion of the third sidewall SW3 of the second side shield 16B. The magnetic layer 260 includes a first portion 260A and a second portion 260B separate from each other. Next, a first planarization layer (not illustrated) is formed to cover the stack including the magnetic layer 260. The first planarization layer has the same configuration as that of the planarization layer 81 of the first embodiment. Next, a first mask (not illustrated) is formed on the first planarization layer. When viewed from above, the first mask covers part of the sidewall of the first portion 260A and part of the sidewall of the second portion 260B. The first mask is formed by patterning a photoresist layer by photolithography, for example.

Next, the first planarization layer and the magnetic layer 260 are etched by, for example, IBE, using the first mask. This step will hereinafter be referred to as the first etching step. The first portion 260A after the etching has a sidewall 260Aa covered by the first mask, and a sidewall 260Ab formed by the etching. The sidewall 260Aa includes part of the first sidewall SW1. The sidewall 260Ab includes the fifth sidewall SW5. The second portion 260B after the etching includes a sidewall 260Ba covered by the first mask, and a sidewall 260Bb formed by the etching. The sidewall 260Ba includes part of the third sidewall SW3. The sidewall 260Bb includes the sixth sidewall SW6.

Next, the first planarization layer remaining after the etching and the first mask are removed. Then, a second planarization layer (not illustrated) is formed to cover the stack including the magnetic layer 260. The second planarization layer has the same configuration as that of the planarization layer 81 of the first embodiment. Next, a second mask 83 is formed on the second planarization layer. In FIG. 19 the region denoted by reference numeral 83 represents the shape of the bottom surface of the second mask 83. When viewed from above, the second mask 83 does not cover part of any of the sidewalls 260Aa, 260Ab, 260Ba and 260Bb. The second mask 83 is formed by patterning a photoresist layer by photolithography, for example.

FIG. 20 shows the next step. In this step, first, the second planarization layer and the magnetic layer 260 are etched by, for example, IBE, using the second mask 83. This step will hereinafter be referred to as the second etching step. In the second etching step, the magnetic layer 260 is partially etched so as to provide the magnetic layer 260 with the second sidewall SW2 and the fourth sidewall SW4, and also the rest of each of the first sidewall SW1 and the third sidewall SW3. This makes the first portion 260A into a first initial side shield 16AP which will later become the first side shield 16A, and makes the second portion 260B into a second initial side shield 16BP which will later become the second side shield 16B.

Next, the second planarization layer remaining after the etching and the second mask 83 are removed. Then, the first gap layer 18 is formed over the entire top surface of the stack. The subsequent steps are the same as those in the first embodiment.

In the present embodiment, the second and fourth sidewalls SW2 and SW4 are formed through the second etching step. More specifically, the position of the front end E2a of the second edge E2 and the position of the front end E4a of the fourth edge E4 are defined by etching. Thus, like the first embodiment, the present embodiment makes it possible to accurately define the positions of the front end E2a of the second edge E2 and the front end E4a of the fourth edge E4, and to bring the front end E2a of the second edge E2 and the front end E4a of the fourth edge E4 close to the medium facing surface 80.

Modification Examples

Figure 21:
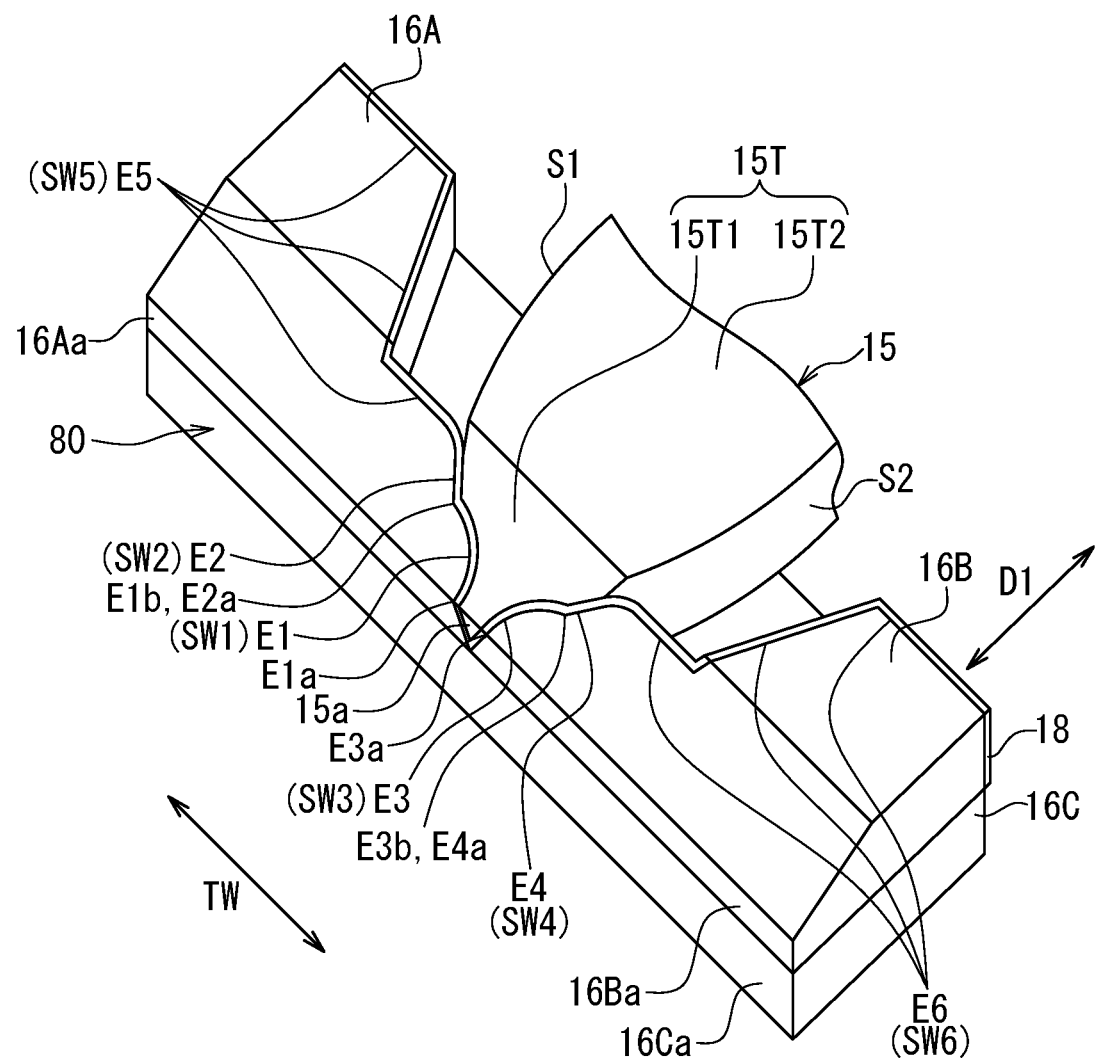
FIG. 21 is a perspective view showing part of a main pole and first and second side shields in the vicinity of a medium facing surface in a first modification example of the magnetic head according to the second embodiment.
Figure 22:
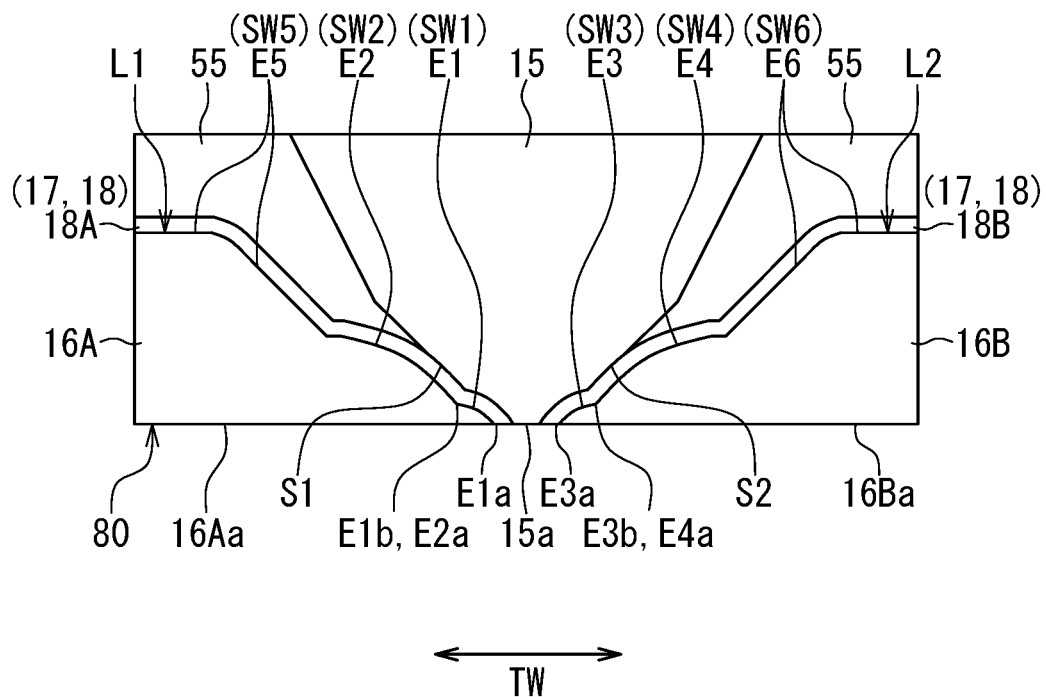
FIG. 22 is a plan view showing part of the main pole and the first and second side shields in the vicinity of the medium facing surface in the first modification example of the magnetic head according to the second embodiment.

A first and a second modification example of the magnetic head according to the present embodiment will now be described. First, the first modification example will be described with reference to FIG. 21 and FIG. 22. FIG. 21 is a perspective view showing part of the main pole 15 and the first and second side shields 16A and 16B in the vicinity of the medium facing surface 80 in the first modification example. FIG. 22 is a plan view showing part of the main pole 15 and the first and second side shields 16A and 16B in the vicinity of the medium facing surface 80 in the first modification example.

In the first modification example, the projecting portion of the first edge E1 of the first sidewall SW1 of the first side shield 16A projecting toward the main pole 15 is a curved portion passing through a portion closer to the main pole 15 relative to the straight line connecting the front end E1a and the rear end E1b. The second edge E2 of the second sidewall SW2 of the first side shield 16A also includes a curved portion projecting toward the main pole 15, as does the first edge E1.

In the first modification example, the projecting portion of the third edge E3 of the third sidewall SW3 of the second side shield 16B projecting toward the main pole 15 is a curved portion passing through a portion closer to the main pole 15 relative to the straight line connecting the front end E3a and the rear end E3b. The fourth edge E4 of the fourth sidewall SW4 of the second side shield 16B also includes a curved portion projecting toward the main pole 15, as does the third edge E3.

Figure 23:
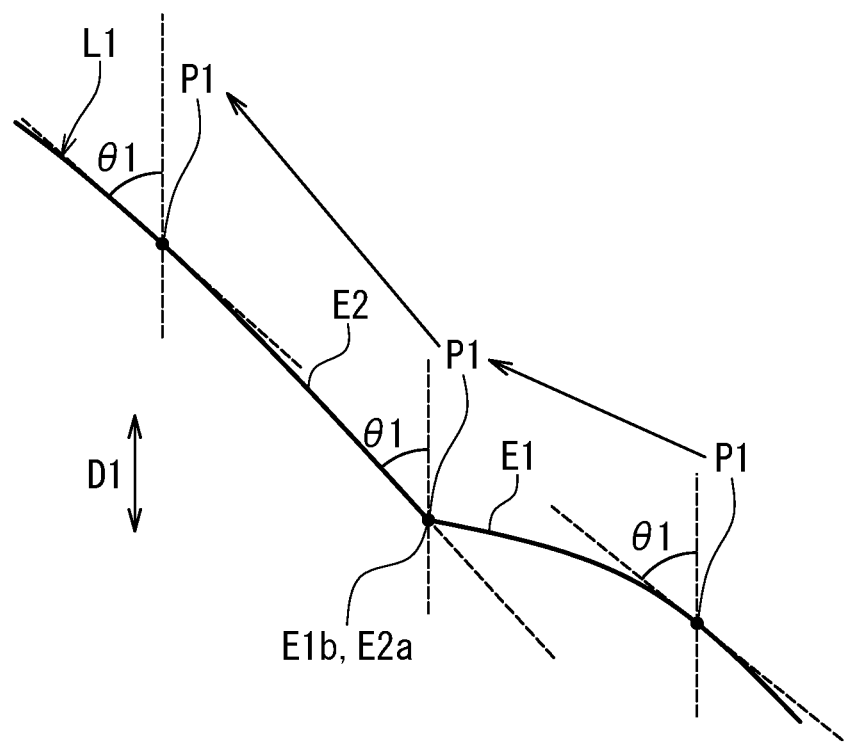
FIG. 23 is an explanatory diagram illustrating a portion of a first contour line in the first modification example of the magnetic head according to the second embodiment of the invention.

The positions of the front end E2a of the second edge E2 and the front end E4a of the fourth edge E4 in the first modification example will now be described in detail. FIG. 23 is an explanatory diagram illustrating a portion of the first contour line L1 formed by the first edge E1 and the second edge E2. As shown in FIG. 23, assume a first point P1 on the first contour line L1. As has been described in relation to the first embodiment, the angle of inclination θ1 of the first contour line L1 relative to the first direction D1 at the first point P1 varies with varying position of the first point P1. In the first modification example, the front end E2a of the second edge E2 is a corner at which there occurs a change in the angle of inclination θ1 when the first point P1 is shifted from the first edge E1 to the second edge E2, the change being a decrease.

Although not illustrated, assume a second point on the second contour line L2 similarly to the first point P1. The angle of inclination of the second contour line L2 relative to the first direction D1 at the second point varies with varying position of the second point. In the first modification example, the front end E4a of the fourth edge E4 is a corner at which there occurs a change in the angle of inclination when the second point is shifted from the third edge E3 to the fourth edge E4, the change being a decrease.

Figure 24:
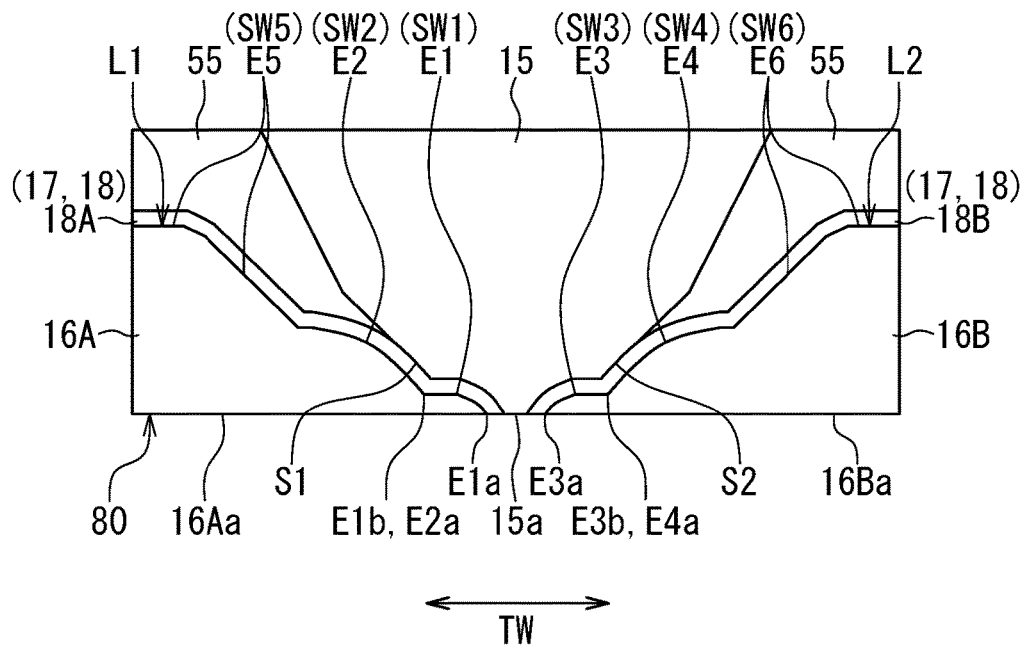
FIG. 24 is a plan view showing part of a main pole and first and second side shields in the vicinity of a medium facing surface in a second modification example of the magnetic head according to the second embodiment.

Next, the second modification example will be described with reference to FIG. 24. FIG. 24 is a plan view showing part of the main pole 15 and the first and second side shields 16A and 16B in the vicinity of the medium facing surface 80 in the second modification example. In the second modification example, the first edge E1 of the first sidewall SW1 of the first side shield 16A includes a curved portion (hereinafter referred to as the first curved portion) projecting toward the the main pole 15, and a first linear portion. The first curved portion includes the front end E1a of the first edge E1. The first linear portion includes the rear end E1b of the first edge E1 and is parallel to the medium facing surface 80.

In the second modification example, the third edge E3 of the third sidewall SW3 of the second side shield 16B includes a curved portion (hereinafter referred to as the second curved portion) projecting toward the the main pole 15, and a second linear portion. The second curved portion includes the front end E3a of the third edge E3. The second linear portion includes the rear end E3b of the third edge E3 and is parallel to the medium facing surface 80.

The remainder of configuration, function and effects of the present embodiment are similar to those of the first embodiment.

Third Embodiment

Figure 25:
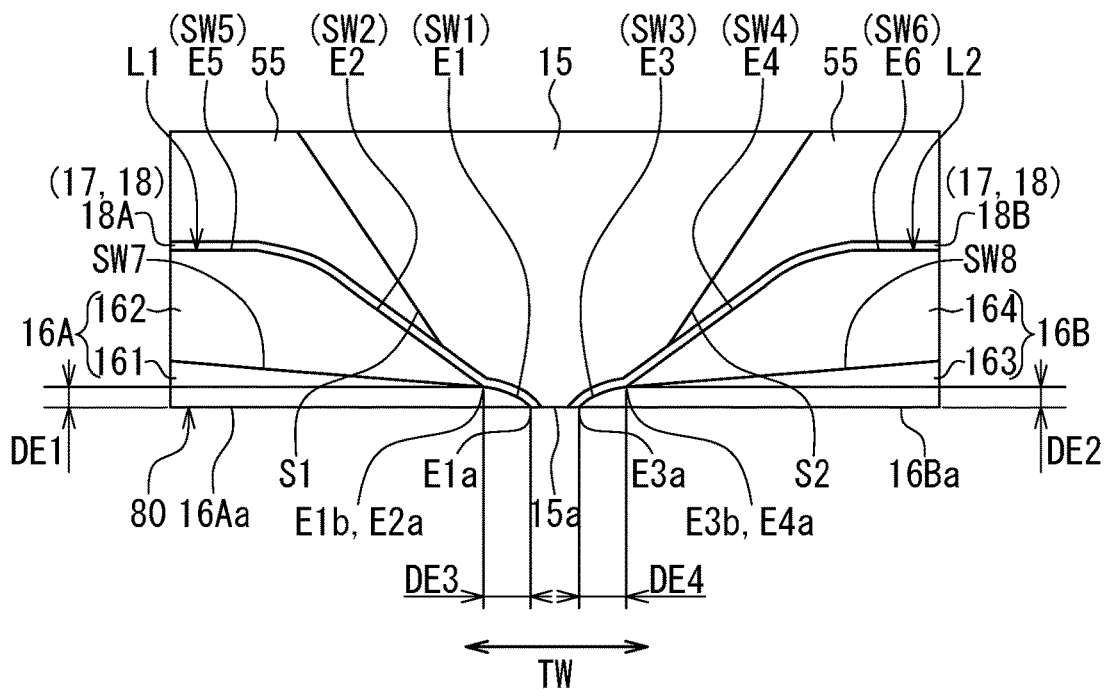
FIG. 25 is a plan view showing part of a main pole and first and second side shields in the vicinity of a medium facing surface in a magnetic head according to a third embodiment of the invention.

A magnetic head according to a third embodiment of the present invention will now be described with reference to FIG. 25. FIG. 25 is a plan view of part of a main pole and first and second side shields in the vicinity of a medium facing surface in the magnetic head according to the present embodiment.

In the present embodiment, the first and second side shields 16A and 16B are configured differently than in the first embodiment. In the present embodiment, the first side shield 16A includes a first magnetic layer 161 and a second magnetic layer 162. The first magnetic layer 161 has the first end face 16Aa and the first sidewall SW1. The second magnetic layer 162 has the second sidewall SW2 and the fifth sidewall SW5. The first end face 16Aa and the first, second and fifth sidewalls SW1, SW2 and SW5 are shaped and located basically in the same manner as in the first embodiment. In the present embodiment, however, the first angle that the first sidewall SW1 forms with the second direction D2 which is perpendicular to the top surface 1a (see FIG. 7 and FIG. 8) of the substrate 1 is substantially constant regardless of distance from the medium facing surface 80.

The first magnetic layer 161 further has a seventh sidewall SW7, the seventh sidewall SW7 being contiguous with the first sidewall SW1 and in contact with the second magnetic layer 162. The seventh sidewall SW7 is inclined relative to the second direction D2, as is the first sidewall SW1.

In the present embodiment, the second side shield 16B includes a third magnetic layer 163 and a fourth magnetic layer 164. The third magnetic layer 163 has the second end face 16Ba and the third sidewall SW3. The fourth magnetic layer 164 has the fourth sidewall SW4 and the sixth sidewall SW6. The second end face 16Ba and the third, fourth and sixth sidewalls SW3, SW4 and SW6 are shaped and located basically in the same manner as in the first embodiment. In the present embodiment, however, the third angle that the third sidewall SW3 forms with the second direction D2 is substantially constant regardless of distance from the medium facing surface 80.

The third magnetic layer 163 further has an eighth sidewall SW8, the eighth sidewall SW8 being contiguous with the third sidewall SW3 and in contact with the fourth magnetic layer 164. The eighth sidewall SW8 is inclined relative to the second direction D2, as is the third sidewall SW3.

The first magnetic layer 161 and the second magnetic layer 162 may be formed of the same material or different materials. The first magnetic layer 161 and the second magnetic layer 162 may have equal saturation flux densities. Alternatively, the second magnetic layer 162 may be higher or lower in saturation flux density than the first magnetic layer 161. The third magnetic layer 163 and the fourth magnetic layer 164 may be formed of the same material or different materials. The third magnetic layer 163 and the fourth magnetic layer 164 may have equal saturation flux densities. Alternatively, the fourth magnetic layer 164 may be higher or lower in saturation flux density than the third magnetic layer 163.

If the saturation flux densities of the first and third magnetic layers 161 and 163 are relatively reduced by making the saturation flux densities of the second and fourth magnetic layers 162 and 164 higher than those of the first and third magnetic layers 161 and 163, respectively, it becomes possible to prevent saturation of magnetic flux in the first and second side shields 16A and 16B by using the second and fourth magnetic layers 162 and 164, while reducing leakage of magnetic flux from the main pole 15 to the first and third magnetic layers 161 and 163 in the vicinity of the medium facing surface 80.

If the distances DE1 and DE2 are small whereas the distances DE3 and DE4 are great, saturation of magnetic flux is likely to occur in a portion of the first magnetic layer 163 that extends from the medium facing surface 80 to the first sidewall SW1 and in a portion of the third magnetic layer 163 that extends from the medium facing surface 80 to the third sidewall SW3. In such a case, it is preferred that the saturation flux densities of the first and third magnetic layers 161 and 163 be relatively increased by making the saturation flux densities of the second and fourth magnetic layers 162 and 164 lower than those of the first and third magnetic layers 161 and 163, respectively. By doing so, it becomes possible to prevent saturation of magnetic flux in the first and second side shields 16A and 16B.

Whether to relatively decrease or increase the saturation flux densities of the first and third magnetic layers 161 and 163 can be appropriately selected depending on how great the distances DE1, DE2, DE3 and DE4 are.

The positions of the front end E2a of the second edge E2 and the front end E4a of the fourth edge E4 in the present embodiment will now be described in detail. As has been described in relation to the first embodiment, the first edge E1 of the first sidewall SW1 and the second edge E2 of the second sidewall SW2 constitute a first contour line L1. Assume a first point P1 on the first contour line L1 as in the first embodiment. The angle of inclination θ1 of the first contour line L1 relative to the first direction D1, which is perpendicular to the medium facing surface 80, at the first point P1 varies with varying position of the first point P1. In the present embodiment, the front end E2a of the second edge E2 is a corner at which there occurs a change in the angle of inclination θ1 when the first point P1 is shifted from the first edge E1 to the second edge E2, the change being a decrease.

The third edge E3 of the third sidewall SW3 and the fourth edge E4 of the fourth sidewall SW4 constitute a second contour line L2. Assume a second point on the second contour line L2 as in the first embodiment. The angle of inclination of the second contour line L2 relative to the first direction D1 at the second point varies with varying position of the second point. In the present embodiment, the front end E4a of the fourth edge E4 is a corner at which there occurs a change in the angle of inclination when the second point is shifted from the third edge E3 to the fourth edge E4, the change being a decrease.

A manufacturing method for the magnetic head according to the present embodiment will now be described with reference to FIG. 26 to FIG. 31. FIG. 26 to FIG. 31 each show a stack of layers formed in the process of manufacturing the magnetic head. Each of FIG. 26 to FIG. 31 shows part of the top surface of the stack. In FIG. 26 to FIG. 31 the symbol "ABS" indicates the location at which the medium facing surface 80 is to be formed.

Figure 26:
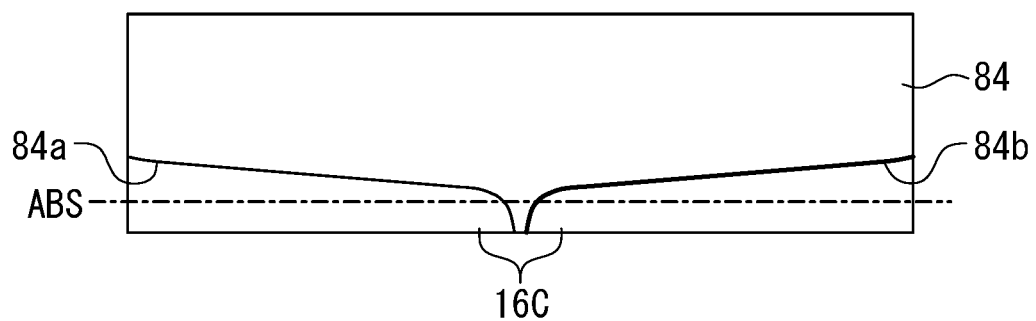
FIG. 26 is a plan view showing a step of a manufacturing method for the magnetic head according to the third embodiment of the invention.

The manufacturing method for the magnetic head according to the present embodiment is the same as the method according to the first embodiment up to the step of forming the bottom shield 16C. FIG. 26 shows the next step. In this step, a mask 84 is formed over the bottom shield 16C and the nonmagnetic layer 54 (see FIG. 7). The mask 84 includes an accommodation section 84a in which the first magnetic layer 161 is to be accommodated later, and an accommodation section 84b in which the third magnetic layer 163 is to be accommodated later. The accommodation section 84a has a wall face corresponding to the first and seventh sidewalls SW1 and SW7. The accommodation section 84b has a wall face corresponding to the third and eighth sidewalls SW3 and SW8. The mask 84 is formed by patterning a photoresist layer by photolithography, for example.

Figure 27:
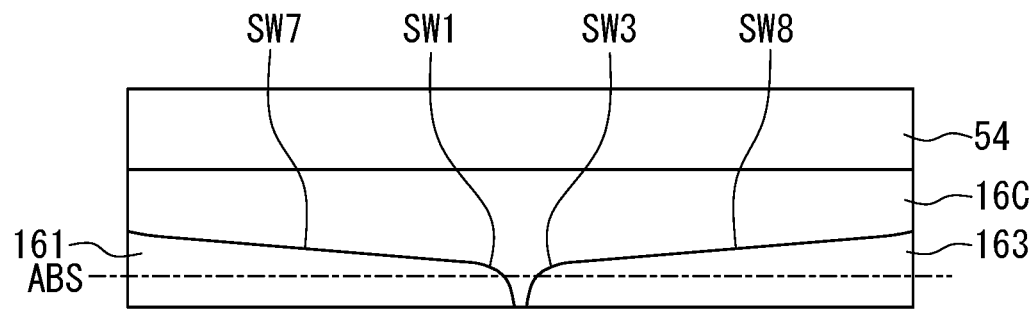
FIG. 27 is a plan view showing a step that follows the step shown in FIG. 26.

FIG. 27 shows the next step. In this step, first, the first magnetic layer 161 is formed in the accommodation section 84a of the mask 84, and the third magnetic layer 163 is formed in the accommodation section 84b of the mask 84. The first magnetic layer 161 and the third magnetic layer 163 may be formed by plating or sputtering. The first magnetic layer 161 has the first sidewall SW1 and the seventh sidewall SW7. The third magnetic layer 163 has the third sidewall SW3 and the eighth sidewall SW8. The mask 84 is then removed.

Figure 28:
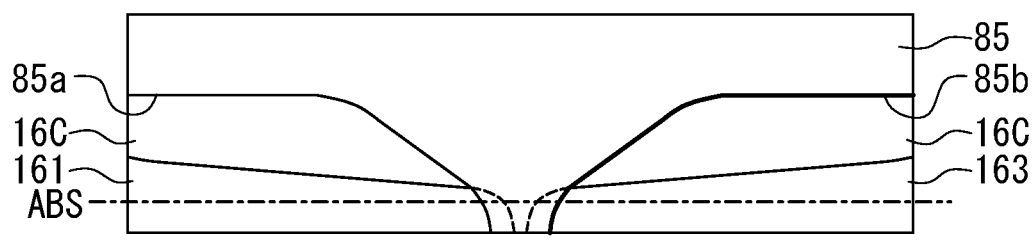
FIG. 28 is a plan view showing a step that follows the step shown in FIG. 27.

FIG. 28 shows the next step. In this step, a mask 85 is formed over the first magnetic layer 161, the third magnetic layer 163, the bottom shield 16C and the nonmagnetic layer 54. The mask 85 includes an accommodation section 85a in which the second magnetic layer 162 is to be accommodated later, and an accommodation section 85b in which the fourth magnetic layer 164 is to be accommodated later. The accommodation section 85a has a wall face corresponding to the second and fifth sidewalls SW2 and SW5. The accommodation section 85b has a wall face corresponding to the fourth and sixth sidewalls SW4 and SW6. The mask 85 is formed by patterning a photoresist layer by photolithography, for example.

Figure 29:
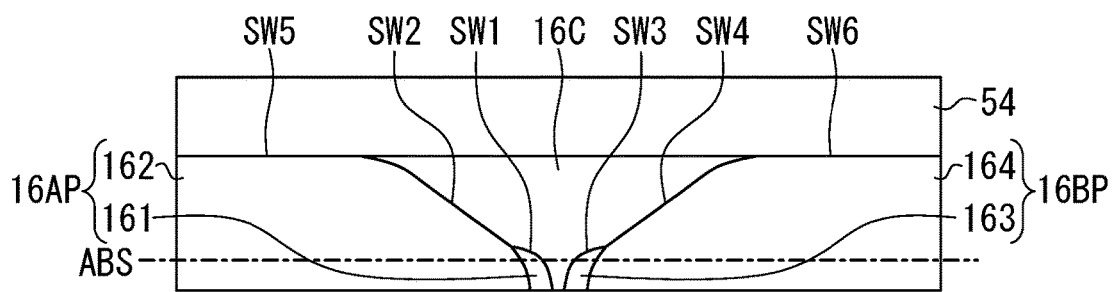
FIG. 29 is a plan view showing a step that follows the step shown in FIG. 28.

FIG. 29 shows the next step. In this step, first, the second magnetic layer 162 is formed in the accommodation section 85a of the mask 85, and the fourth magnetic layer 164 is formed in the accommodation section 85b of the mask 85. The second magnetic layer 162 and the fourth magnetic layer 164 may be formed by plating or sputtering. The second magnetic layer 162 has the second sidewall SW2 and the fifth sidewall SW5. The fourth magnetic layer 164 has the fourth sidewall SW4 and the sixth sidewall SW6. The mask 85 is then removed.

By forming the second magnetic layer 162 and the fourth magnetic layer 164 in the step of FIG. 29, a first initial side shield 16AP and a second initial side shield 16BP are completed. The first initial side shield 16AP becomes the first side shield 16A later. The second initial side shield 16BP becomes the second side shield 16B later. The first initial side shield 16AP includes the first magnetic layer 161 and the second magnetic layer 162. The second initial side shield 16BP includes the third magnetic layer 163 and the fourth magnetic layer 164.

Figure 30:
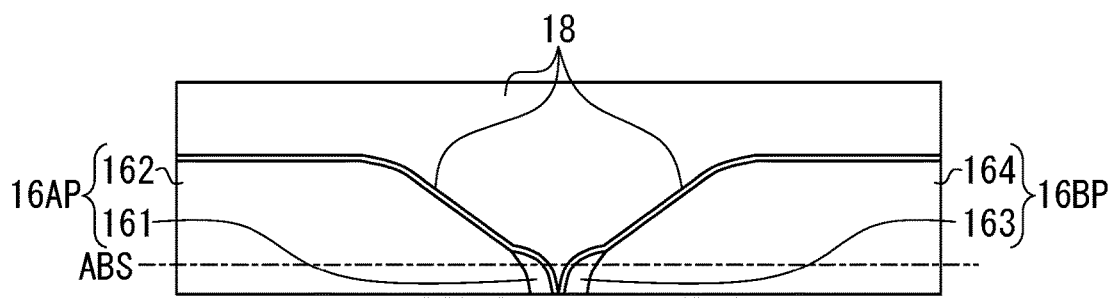
FIG. 30 is a plan view showing a step that follows the step shown in FIG. 29.

FIG. 30 shows the next step. In this step, the first gap layer 18 is formed over the entire top surface of the stack. FIG. 30 omits the illustration of portions of the first gap layer 18 that are formed on the first and second initial side shields 16AP and 16BP. The first gap layer 18 is formed by the same method as in the first embodiment.

Figure 31:
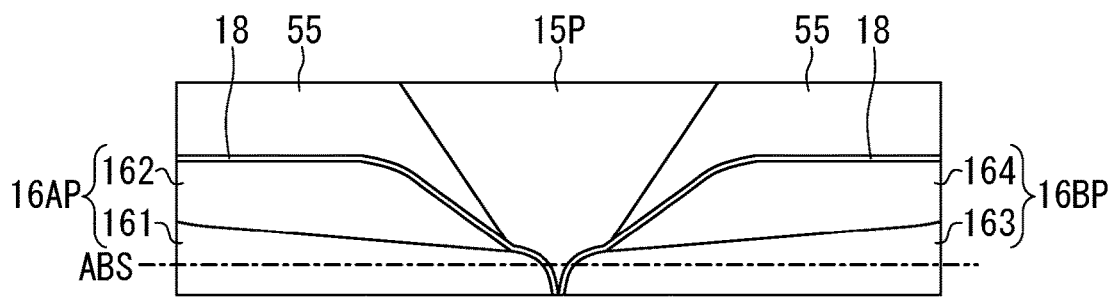
FIG. 31 is a plan view showing a step that follows the step shown in FIG. 30.

FIG. 31 shows the next step. In this step, first, the first gap layer 18 is selectively etched to form therein an opening for exposing the top surface of the coupling section 34 (see FIG. 7) and an opening for exposing the top surface of the first connection layer which has been described in relation to the first embodiment. Next, an initial main pole 15P, which will later become the main pole 15, is formed on the first gap layer 18 and the coupling section 34, and the second connection layer (not illustrated) is formed on the first connection layer. Next, the initial main pole 15P, the first and second initial side shields 16AP and 16BP, the first gap layer 18, the nonmagnetic layer 55 and the second connection layer are polished by, for example, CMP until the level of the top surface of the initial main pole 15P reaches the level of the flat portion 15T2 (see FIG. 6) of the top surface 15T of the main pole 15. The subsequent steps are the same as those in the first embodiment.

Modification Example

Figure 32:
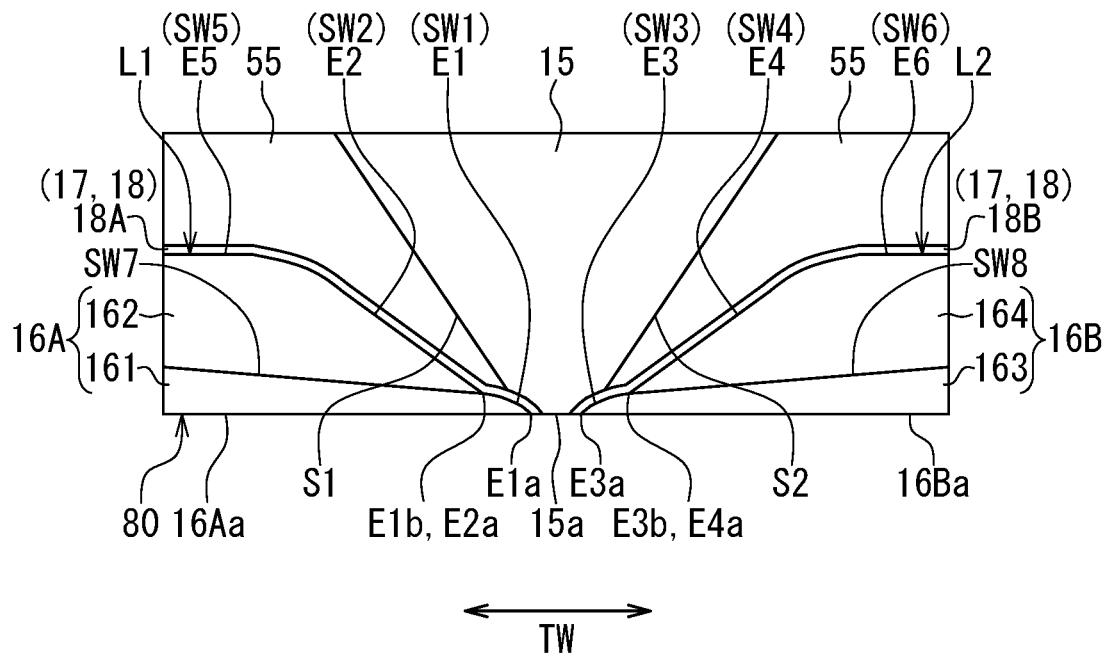
FIG. 32 is a plan view showing part of a main pole and first and second side shields in the vicinity of a medium facing surface in a modification example of the magnetic head according to the third embodiment.

Reference is now made to FIG. 32 to describe a modification example of the magnetic head according to the present embodiment. FIG. 32 is a plan view showing part of the main pole 15 and the first and second side shields 16A and 16B in the vicinity of the medium facing surface 80 in the modification example. In the modification example, the first portion 18A of the first gap layer 18 and the nonmagnetic layer 55 are interposed between the entire second sidewall SW2 and the first side surface S1, and the second portion 18B of the first gap layer 18 and the nonmagnetic layer 55 are interposed between the entire fourth sidewall SW4 and the second side surface S2. As a result, in the modification example, the minimum distance between the second sidewall SW2 and the first side surface S1 is greater than the minimum distance between the first sidewall SW1 and the first side surface S1, and the minimum distance between the fourth sidewall SW4 and the second side surface S2 is greater than the minimum distance between the third sidewall SW3 and the second side surface S2.

The modification example enables reducing or eliminating the leakage of magnetic flux from the main pole 15 to the first and second side shields 16A and 16B.

The present embodiment cannot provide the effect resulting from forming the second and fourth sidewalls SW2 and SW4 by etching, which has been described in relation to the first embodiment. The remainder of configuration, function and effects of the present embodiment are similar to those of the first embodiment.

Fourth Embodiment

Figure 33:
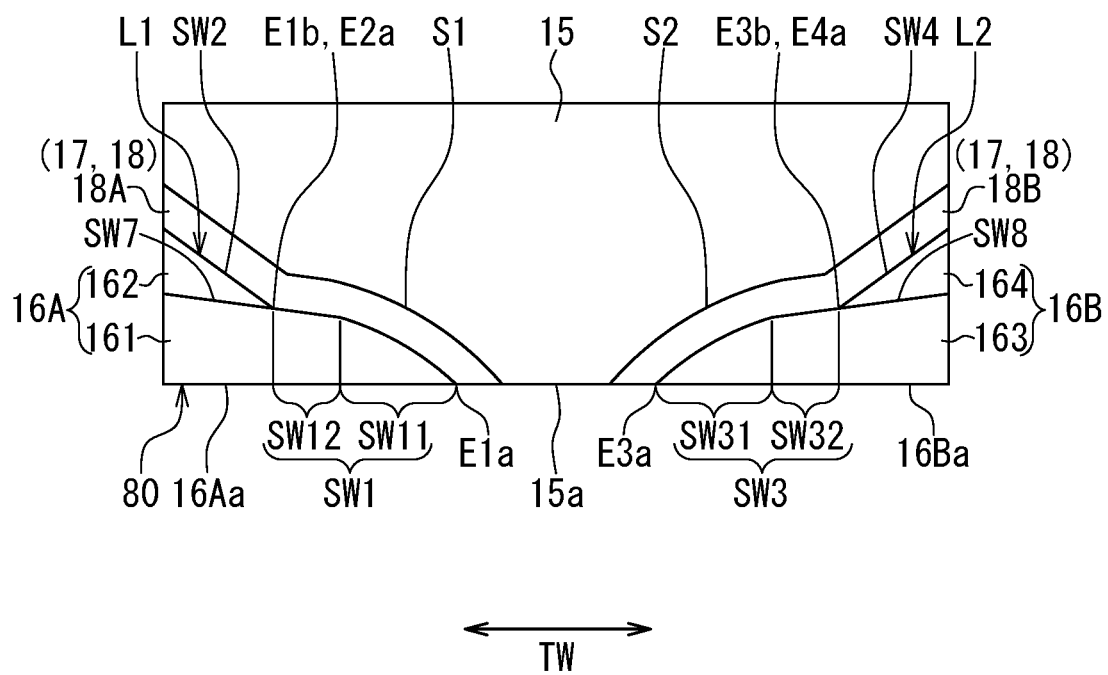
FIG. 33 is a plan view showing a part of a main pole and first and second side shields in the vicinity of a medium facing surface in a magnetic head according to a fourth embodiment of the invention.

A magnetic head according to a fourth embodiment of the present invention will now be described with reference to FIG. 33. FIG. 33 is a plan view of part of a main pole and first and second side shields in the vicinity of a medium facing surface in the magnetic head according to the present embodiment. In the present embodiment, the first sidewall SW1 and the third sidewall SW3 are configured differently than in the third embodiment.

In the present embodiment, as shown in FIG. 33, the first sidewall SW1 includes a first front portion SW11 connected to the first end face 16Aa, and a first rear portion SW12 connected to the second sidewall SW2. The third sidewall SW3 includes a second front portion SW31 connected to the second end face 16Ba, and a second rear portion SW32 connected to the fourth sidewall SW4.

An angle that the first rear portion SW12 forms with the second direction D2 which is perpendicular to the top surface 1a (see FIG. 7 and FIG. 8) of the substrate 1 is smaller than an angle that the first front portion SW11 forms with the second direction D2. An angle that the second rear portion SW32 forms with the second direction D2 is smaller than an angle that the second front portion SW31 forms with the second direction D2.

A manufacturing method for the magnetic head according to the present embodiment will now be described with reference to FIG. 34 to FIG. 38. FIG. 34 to FIG. 38 each show a stack of layers formed in the process of manufacturing the magnetic head. Each of FIG. 34 to FIG. 38 shows part of the top surface of the stack. In FIG. 34 to FIG. 38 the symbol "ABS" indicates the location at which the medium facing surface 80 is to be formed.

Figure 34:
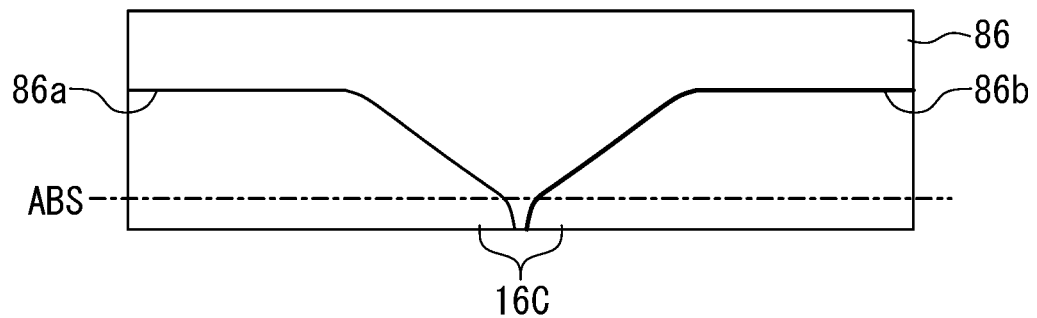
FIG. 34 is a plan view showing a step of a manufacturing method for the magnetic head according to the fourth embodiment of the invention.

The manufacturing method for the magnetic head according to the present embodiment is the same as the method according to the third embodiment up to the step of forming the bottom shield 16C. FIG. 34 shows the next step. In this step, a mask 86 is formed over the bottom shield 16C and the nonmagnetic layer 54 (see FIG. 7). The mask 86 includes an accommodation section 86a in which an initial first magnetic layer is to be accommodated later, and an accommodation section 86b in which an initial third magnetic layer is to be accommodated later. The mask 86 is formed by patterning a photoresist layer by photolithography, for example.

Figure 35:
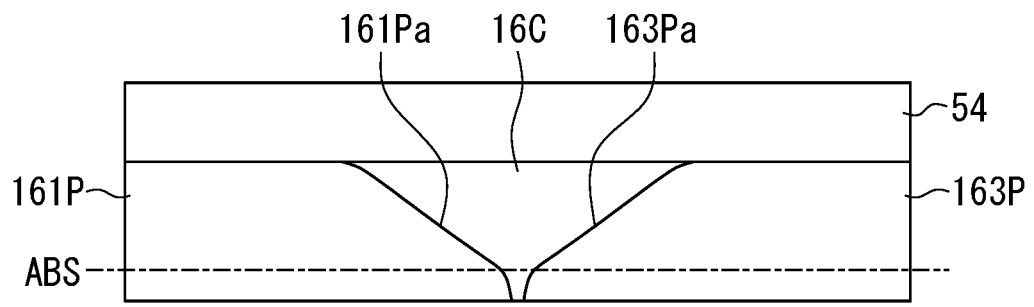
FIG. 35 is a plan view showing a step that follows the step shown in FIG. 34.

FIG. 35 shows the next step. In this step, first, the initial first magnetic layer 161P having a sidewall 161Pa is formed in the accommodation section 86a of the mask 86, and the initial third magnetic layer 163P having a sidewall 163Pa is formed in the accommodation section 86b of the mask 86. The sidewall 161Pa includes the first front portion SW11 of the first sidewall SW1. The sidewall 163Pa includes the second front portion SW31 of the third sidewall SW3. The initial first magnetic layer 161P and the initial third magnetic layer 163P may be formed by plating or sputtering. Next, the mask 86 is removed.

Figure 36:
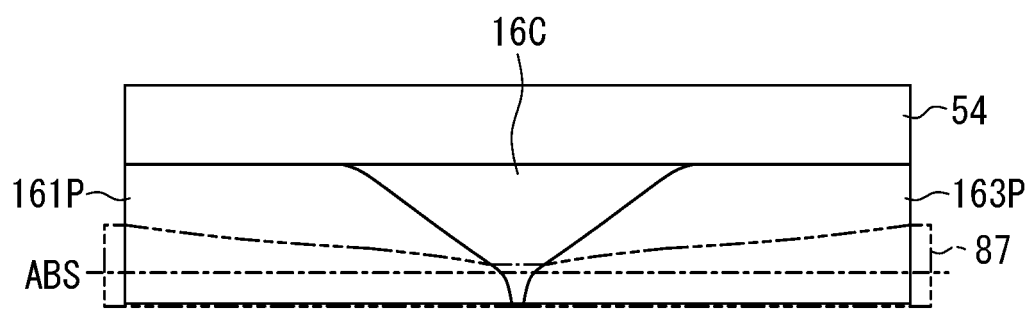
FIG. 36 is a plan view showing a step that follows the step shown in FIG. 35.

FIG. 36 shows the next step. In this step, a mask 87 is formed over the initial first magnetic layer 161P, the initial third magnetic layer 163P, the bottom shield 16C and the nonmagnetic layer 54. The mask 87 covers the first front portion SW11 and the second front portion SW31 of the sidewalls 161Pa and 163Pa, and does not cover the other portions of the sidewalls 161Pa and 163Pa.

Figure 37:
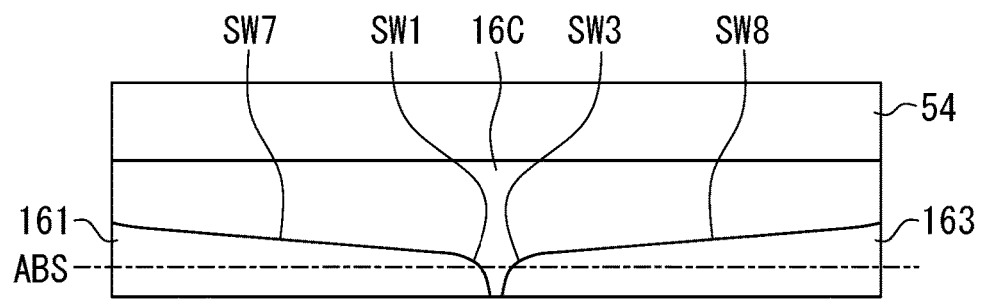
FIG. 37 is a plan view showing a step that follows the step shown in FIG. 36.

FIG. 37 shows the next step. In this step, first, part of the initial first magnetic layer 161P and part of the initial third magnetic layer 163P are etched using the mask 87 by IBE, for example. As a result of this etching, the initial first magnetic layer 161P is provided with the first rear portion SW12 of the first sidewall SW1 and the seventh sidewall SW7, and the initial third magnetic layer 163P is provided with the second rear portion SW32 of the third sidewall SW3 and the eighth sidewall SW8. This makes the initial first magnetic layer 161P into the first magnetic layer 161, and makes the initial third magnetic layer 163P into the third magnetic layer 163. Next, the mask 87 is removed.

Figure 38:
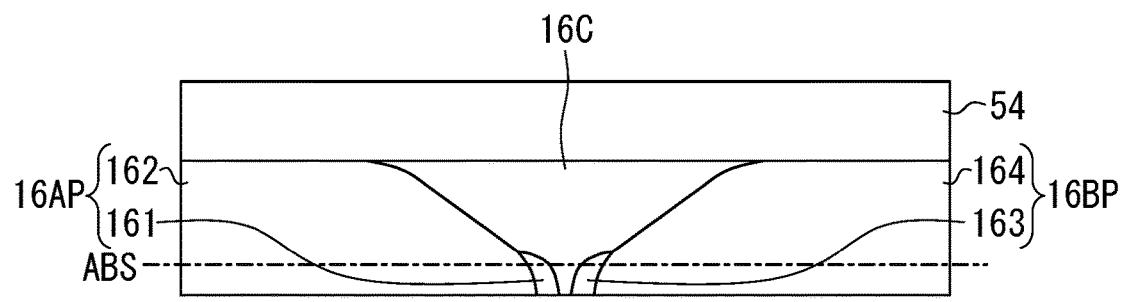
FIG. 38 is a plan view showing a step that follows the step shown in FIG. 37.

FIG. 38 shows the next step. In this step, the second and fourth magnetic layers 162 and 164 are formed in the same manner as in the third embodiment. The subsequent steps are the same as those of the third embodiment.

In the present embodiment, the first rear portion SW12 is formed in the step of FIG. 37 such that the first rear portion SW12 forms a smaller angle with the second direction D2 than does the first front portion SW11. Further, the second rear portion SW32 is formed in the step of FIG. 37 such that the second rear portion SW32 forms a smaller angle with the second direction D2 than does the second front portion SW31.

Further, in the present embodiment, the second and fourth sidewalls SW2 and SW4 are formed by etching. More specifically, the position of the front end E2a of the second edge E2 and the position of the front end E4a of the fourth edge E4 are defined by etching. Thus, the present embodiment makes it possible to accurately define the positions of the front end E2a of the second edge E2 and the front end E4a of the fourth edge E4, and to bring the front end E2a of the second edge E2 and the front end E4a of the fourth edge E4 close to the medium facing surface 80.

The remainder of configuration, function and effects of the present embodiment are similar to those of the third embodiment.

The present invention is not limited to the foregoing embodiments, and various modifications may be made thereto. For example, as far as the requirements of the appended claims are met, the shapes and locations of the main pole 15, the first side shield 16A and the second side shield 16B are not limited to the respective examples illustrated in the foregoing embodiments, and can be freely chosen.

Obviously, many modifications and variations of the present invention are possible in the light of the above teachings. Thus, it is to be understood that, within the scope of the appended claims and equivalents thereof, the invention may be practiced in other than the foregoing most preferable embodiments.

What is claimed is:
1. A magnetic head for perpendicular magnetic recording, comprising:
   a medium facing surface configured to face a recording medium;

a coil configured to produce a magnetic field corresponding to data to be written on the recording medium;
a main pole configured to pass a magnetic flux corresponding to the magnetic field produced by the coil, and to produce a write magnetic field for writing the data on the recording medium by means of a perpendicular magnetic recording system;
a write shield formed of a magnetic material;
a gap section formed of a nonmagnetic material and provided between the main pole and the write shield; and
a substrate having a top surface, wherein
the coil, the main pole, the write shield and the gap section are disposed above the top surface of the substrate,
the write shield includes a first side shield and a second side shield located on opposite sides of the main pole in a track width direction,
the first side shield has a first end face located in the medium facing surface, and has a first sidewall and a second sidewall facing the main pole,
the second side shield has a second end face located in the medium facing surface, and has a third sidewall and a fourth sidewall facing the main pole,
the first sidewall is connected to the first end face,
the second sidewall is located farther from the medium facing surface than is the first sidewall,
the third sidewall is connected to the second end face,
the fourth sidewall is located farther from the medium facing surface than is the third sidewall,
the first sidewall has a first edge farthest from the top surface of the substrate,
the second sidewall has a second edge farthest from the top surface of the substrate,
the third sidewall has a third edge farthest from the top surface of the substrate,
the fourth sidewall has a fourth edge farthest from the top surface of the substrate,
each of the first and third edges has a front end located in the medium facing surface and a rear end opposite to the front end,
each of the second and fourth edges has a front end closest to the medium facing surface,
a distance between the rear end of the first edge and the rear end of the third edge in the track width direction is greater than a distance between the front end of the first edge and the front end of the third edge in the track width direction,
a distance between the second edge and the fourth edge in the track width direction increases with increasing distance from the medium facing surface,
the first edge and the second edge are contiguous to each other to form a first contour line, the rear end of the first edge and the front end of the second edge coinciding with each other,
the third edge and the fourth edge are contiguous to each other to form a second contour line, the rear end of the third edge and the front end of the fourth edge coinciding with each other,
the front end of the second edge is an inflection point or a corner at which there occurs a change in an angle of inclination of the first contour line relative to a first direction at a first point on the first contour line when the first point is shifted from the first edge to the second edge, the first direction being perpendicular to the medium facing surface, the change being a decrease,
the front end of the fourth edge is an inflection point or a corner at which there occurs a change in an angle of inclination of the second contour line relative to the first direction at a second point on the second contour line when the second point is shifted from the third edge to the fourth edge, the change being a decrease,
the main pole has an end face located in the medium facing surface, and has a first side surface and a second side surface,
part of the first side surface is opposed to the first sidewall,
part of the second side surface is opposed to the third sidewall,
the gap section includes a first portion interposed between the first side surface and the first and second sidewalls, and a second portion interposed between the second side surface and the third and fourth sidewalls,
a distance from the medium facing surface to the front end of the second edge, and a distance from the medium facing surface to the front end of the fourth edge are each within a range of 20 to 90 nm, and
a distance between the front end and the rear end of the first edge in the track width direction, and a distance between the front end and the rear end of the third edge in the track width direction are each within a range of 40 to 290 nm.

2. The magnetic head for perpendicular magnetic recording according to claim 1, wherein
in the medium facing surface, a distance between the first sidewall and the third sidewall in the track width direction decreases toward the top surface of the substrate,
an angle that the second sidewall forms with a direction perpendicular to the top surface of the substrate is smaller than an angle that the first sidewall forms with the direction perpendicular to the top surface of the substrate in the medium facing surface, and
an angle that the fourth sidewall forms with the direction perpendicular to the top surface of the substrate is smaller than an angle that the third sidewall forms with the direction perpendicular to the top surface of the substrate in the medium facing surface.

3. The magnetic head for perpendicular magnetic recording according to claim 2, wherein
the first sidewall includes a first front portion connected to the first end face, and a first rear portion connected to the second sidewall,
the third sidewall includes a second front portion connected to the second end face, and a second rear portion connected to the fourth sidewall,
an angle that the first rear portion forms with the direction perpendicular to the top surface of the substrate is smaller than an angle that the first front portion forms with the direction perpendicular to the top surface of the substrate, and
an angle that the second rear portion forms with the direction perpendicular to the top surface of the substrate is smaller than an angle that the second front portion forms with the direction perpendicular to the top surface of the substrate.

4. The magnetic head for perpendicular magnetic recording according to claim 1, wherein
the first side shield includes a first magnetic layer having the first sidewall, and a second magnetic layer having the second sidewall, and
the second side shield includes a third magnetic layer having the third sidewall, and a fourth magnetic layer having the fourth sidewall.

5. The magnetic head for perpendicular magnetic recording according to claim 4, wherein the first magnetic layer and the second magnetic layer have equal saturation flux densities, and the third magnetic layer and the fourth magnetic layer have equal saturation flux densities.

6. The magnetic head for perpendicular magnetic recording according to claim 4, wherein the second magnetic layer is higher in saturation flux density than the first magnetic layer, and the fourth magnetic layer is higher in saturation flux density than the third magnetic layer.

7. The magnetic head for perpendicular magnetic recording according to claim 4, wherein the second magnetic layer is lower in saturation flux density than the first magnetic layer, and the fourth magnetic layer is lower in saturation flux density than the third magnetic layer.

8. The magnetic head for perpendicular magnetic recording according to claim 1, wherein
  a minimum distance between the second sidewall and the first side surface is greater than a minimum distance between the first sidewall and the first side surface, and
  a minimum distance between the fourth sidewall and the second side surface is greater than a minimum distance between the third sidewall and the second side surface.

9. The magnetic head for perpendicular magnetic recording according to claim 1, wherein each of the first and third edges includes a portion projecting toward the main pole.

10. The magnetic head for perpendicular magnetic recording according to claim 1, wherein each of the second and fourth edges includes a portion projecting toward the main pole.

11. A manufacturing method for the magnetic head for perpendicular magnetic recording of claim 1, comprising the steps of:
  forming a first initial side shield and a second initial side shield, the first initial side shield becoming the first side shield later, the second initial side shield becoming the second side shield later;
  forming the first and second portions of the gap section after the first and second initial side shields are formed;
  forming an initial main pole after the first and second portions of the gap section are formed;
  forming the coil; and
  forming the medium facing surface so that the first initial side shield becomes the first side shield, the second initial side shield becomes the second side shield, and the initial main pole becomes the main pole.

12. The manufacturing method according to claim 11, wherein the step of forming the first initial side shield and the second initial side shield includes the steps of:
  forming a magnetic layer having at least part of the first sidewall and at least part of the third sidewall; and
  partially etching the magnetic layer so as to provide the magnetic layer with the second sidewall and the fourth sidewall.

13. The manufacturing method according to claim 12, wherein the step of forming the first initial side shield and the second initial side shield further includes the steps of:
  forming a planarization layer to cover the magnetic layer, which is performed after the step of forming the magnetic layer and before the step of partially etching the magnetic layer; and
  forming a mask on the planarization layer, which is performed after the step of forming the planarization layer and before the step of partially etching the magnetic layer,
  wherein, in the step of partially etching the magnetic layer, the mask is used to partially etch the magnetic layer.

14. The manufacturing method according to claim 11, wherein
  the first side shield includes a first magnetic layer having the first sidewall, and a second magnetic layer having the second sidewall,
  the second side shield includes a third magnetic layer having the third sidewall, and a fourth magnetic layer having the fourth sidewall, and
  the step of forming the first initial side shield and the second initial side shield includes the steps of:
    forming the first magnetic layer and the third magnetic layer; and
    forming the second magnetic layer and the fourth magnetic layer after the first magnetic layer and the third magnetic layer are formed.

15. The manufacturing method according to claim 14, wherein the step of forming the first magnetic layer and the third magnetic layer includes the steps of:
  forming a mask having two accommodation sections in which the first magnetic layer and the third magnetic layer are to be accommodated later; and
  forming the first magnetic layer and the third magnetic layer in the two accommodation sections.

16. The manufacturing method according to claim 15, wherein the first magnetic layer and the third magnetic layer are formed by plating.

17. The manufacturing method according to claim 15, wherein the first magnetic layer and the third magnetic layer are formed by sputtering.

18. The manufacturing method according to claim 14, wherein
  the first sidewall includes a first front portion connected to the first end face, and a first rear portion connected to the second sidewall,
  the third sidewall includes a second front portion connected to the second end face, and a second rear portion connected to the fourth sidewall, and
  the step of forming the first magnetic layer and the third magnetic layer includes the steps of:
    forming an initial first magnetic layer including the first front portion and an initial third magnetic layer including the second front portion; and
    partially etching the initial first magnetic layer to provide the initial first magnetic layer with the first rear portion so as to make the initial first magnetic layer into the first magnetic layer, and partially etching the initial third magnetic layer to provide the initial third magnetic layer with the second rear portion so as to make the initial third magnetic layer into the third magnetic layer.

19. The manufacturing method according to claim 18, wherein
  an angle that the first rear portion forms with a direction perpendicular to the top surface of the substrate is smaller than an angle that the first front portion forms with the direction perpendicular to the top surface of the substrate, and
  an angle that the second rear portion forms with the direction perpendicular to the top surface of the substrate is smaller than an angle that the second front portion forms with the direction perpendicular to the top surface of the substrate.

20. The manufacturing method according to claim 14, wherein the step of forming the second magnetic layer and the fourth magnetic layer includes the steps of:

forming a mask having two accommodation sections in which the second magnetic layer and the fourth magnetic layer are to be accommodated later; and forming the second magnetic layer and the fourth magnetic layer in the two accommodation sections.

21. The manufacturing method according to claim 20, wherein the second magnetic layer and the fourth magnetic layer are formed by plating.

22. The manufacturing method according to claim 20, wherein the second magnetic layer and the fourth magnetic layer are formed by sputtering.

* * * * *